United States Patent
Hosoya et al.

(10) Patent No.: US 10,043,544 B2
(45) Date of Patent: Aug. 7, 2018

(54) MAGNETIC RECORDING MEDIUM USING HEXAGONAL FERRITE POWDER

(71) Applicant: FUJIFILM Corporation, Tokyo (JP)

(72) Inventors: Yoichi Hosoya, Minami-ashigara (JP); Toshihide Aoshima, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/258,292

(22) Filed: Sep. 7, 2016

(65) Prior Publication Data

US 2017/0069344 A1    Mar. 9, 2017

(30) Foreign Application Priority Data

Sep. 8, 2015    (JP) ................. 2015-176919

(51) Int. Cl.
   *G11B 5/706* (2006.01)
   *G11B 5/70* (2006.01)
   *G11B 5/714* (2006.01)

(52) U.S. Cl.
   CPC ........ *G11B 5/70678* (2013.01); *G11B 5/7013* (2013.01); *G11B 5/714* (2013.01)

(58) Field of Classification Search
   None
   See application file for complete search history.

(56) References Cited

U.S. PATENT DOCUMENTS

| | | | |
|---|---|---|---|
| 6,251,474 B1 | 6/2001 | Hong et al. | |
| 6,599,608 B2 | 7/2003 | Hong et al. | |
| 2003/0148128 A1* | 8/2003 | Tomaru | G11B 5/738 428/480 |
| 2004/0219352 A1* | 11/2004 | Harasawa | G11B 5/70 428/329 |
| 2004/0219353 A1* | 11/2004 | Harasawa et al. | G11B 5/70 428/329 |
| 2009/0046396 A1* | 2/2009 | Nagata | G11B 5/00821 360/324 |
| 2011/0003241 A1* | 1/2011 | Kaneko | C08G 73/0206 430/7 |
| 2012/0243120 A1* | 9/2012 | Harasawa | G11B 5/70 360/90 |
| 2012/0298908 A1* | 11/2012 | Ueyama | B82Y 30/00 252/62.51 R |
| 2013/0027808 A1* | 1/2013 | Kasada | G11B 5/70 360/110 |
| 2014/0374645 A1* | 12/2014 | Kikuchi | G11B 5/7013 252/62.54 |
| 2015/0187471 A1 | 7/2015 | Hosoya | |

FOREIGN PATENT DOCUMENTS

| | | |
|---|---|---|
| JP | 2002-56518 A | 2/2002 |
| JP | 2008-84419 A | 4/2008 |
| JP | 2011-181116 A | 9/2011 |
| JP | 2015-28830 A | 2/2015 |
| JP | 2015-127986 A | 7/2015 |

OTHER PUBLICATIONS

Office Action dated Apr. 24, 2018, from Japanese Patent Office in counterpart Japanese Application No. 2015-176919.

* cited by examiner

*Primary Examiner* — Kevin M Bernatz

(74) *Attorney, Agent, or Firm* — Sughrue Mion, PLLC

(57) ABSTRACT

The magnetic recording medium has a magnetic layer containing ferromagnetic powder and binder on a nonmagnetic support, wherein the ferromagnetic powder is hexagonal ferrite powder containing, based on number of particles, greater than or equal to 80% isotropic particles that satisfy the relation 1: major axis length/minor axis length <1.2, with an average particle size of the hexagonal ferrite powder being less than or equal to 30 nm, and a squareness in a vertical direction of the magnetic layer being greater than or equal to 0.65 but less than or equal to 1.00.

12 Claims, 4 Drawing Sheets

MAGNETIC RECORDING MEDIUM USING HEXAGONAL FERRITE POWDER

CROSS-REFERENCE TO RELATED APPLICATIONS

This application claims priority under 35 U.S.C 119 to Japanese Patent Application No. 2015-176919 filed on Sep. 8, 2015. The above application is hereby expressly incorporated by reference, in its entirety.

BACKGROUND OF THE INVENTION

Field of the Invention

The present invention relates to a magnetic recording medium.

Discussion of the Background

Investigation has been conducted into the ferromagnetic powder contained in the magnetic layers of magnetic recording media, into additives that are added to the magnetic layers, and the like to enhance the performance of magnetic recording media. With regard to the above investigation, reference can be made to Japanese Unexamined Patent Publication (KOKAI) No. 2008-84419 (Document 1), Japanese Unexamined Patent Publication (KOKAI) No. 2002-56518 (Document 2), U.S. Pat. No. 6,599,608 (Document 3), U.S. Pat. No. 6,251,474 (Document 4), as well as Japanese Unexamined Patent Publication (KOKAI) No. 2015-28830 (Document 5) and English language family member US2014/374645A1, which are expressly incorporated herein by reference in their entirety.

SUMMARY OF THE INVENTION

Document 1 discloses iron nitride magnetic powder and Document 2 discloses magnetic powder contained of transition metal elements, primarily iron and rare earth elements (specifically cobalt ferrite), as the ferromagnetic powder (described as "magnetic powder" in Documents 1 and 2) contained in magnetic layers.

By contrast, Documents 3 and 4 disclose barium and strontium ferrites. Based on differences in crystalline structure, ferrites are classified as spinel ferrites, hexagonal ferrite, and the like. For example, cobalt ferrite that is described in Document 2 is spinel ferrite, while barium ferrite and strontium ferrite are hexagonal ferrites.

Various ferromagnetic powders are known to be used in the magnetic layers of magnetic recording media. Generally, hexagonal ferrite powders are said to be ferromagnetic powders that are better suited to achieving high-density recording than other ferromagnetic powders, such as those described in Document 1 and 2. The main reasons for this are that hexagonal ferrite powders have coercive force that is of the degree employed in permanently magnetic materials; have magnetic anisotropy—which is the basis of coercive force—that is capable of maintaining high coercive force even with a reduction in particle size because it can have high coercive force such as that employed as permanent magnetic materials and its magnetic anisotropy on which coercive force is based derives from a crystalline structure; and magnetic recording media employing hexagonal ferrite powder in the magnetic layer can afford high-density characteristics due to the vertical component.

With regard to magnetic recording media having a magnetic layer containing hexagonal ferrite powder, Examples in Document 5 disclose a magnetic recording medium having a magnetic layer containing ferromagnetic plate-like hexagonal ferrite powder and a polyalkyleneimine derivative (see Document 5, paragraph 0126). The magnetic recording medium described in Examples in Document 5 achieves a good result in evaluation of the electromagnetic characteristics (signal-to-noise ratio (SNR)) that is conducted by recording signals at linear recording densities of 172 kfci and 86 kfci. However, in response to the even higher density recording of recent years, magnetic recording media are required to exhibit good electromagnetic characteristics in the high-density recording region where signals are recorded at even higher density.

An aspect of the present invention provides for a magnetic recording medium that contains hexagonal ferrite powder in a magnetic layer and that is capable of exhibiting good electromagnetic characteristics in the high-density recording region.

An aspect of the present invention relates to a magnetic recording medium having a magnetic layer containing ferromagnetic powder and binder on a nonmagnetic support, wherein the ferromagnetic powder is hexagonal ferrite powder containing, based on number of particles, greater than or equal to 80% isotropic particles that satisfy the following relation 1:

major axis length/minor axis length <1.2;

that is, the major axis length divided by the minor axis length is less than 1.2;

with the average particle size of the hexagonal ferrite powder being less than or equal to 30 nm, and the squareness in the vertical direction of the magnetic layer being greater than or equal to 0.65 but less than or equal to 1.00.

Much (specifically, greater than or equal to 80% based on number of particles) of the hexagonal ferrite powder that is contained in the magnetic layer of the above magnetic recording medium is comprised of isotropic particles satisfying relation 1 above, with an average particle size of less than or equal to 30 nm.

In the present invention and the present specification, the term "isotropic" as relates to particles means not plate-like. Isotropic shapes include elliptical shapes and spherical shapes, as well as octahedral shapes and irregular shapes. A plate-like shape is one that contains a main surface. The term "main surface" means an outer surface that accounts for the greatest area on the particle. A hexagonal flat shape is an example of a particle shape of plate-like hexagonal ferrite. For example, the surface accounting for the greatest area in a hexagonal flat shape is the hexagonal outer shape; this portion is referred to as the main surface.

Documents 3 and 4 disclose barium and strontium ferrites of substantially spherical shape as hexagonal ferrite having an isotropic shape. However, the smallest particle size of the particles that are obtained in Examples is 0.1 µm (100 nm) (see Examples 6 and 7 in Documents 3 and 4), which is unsuitable as ferromagnetic powder for achieving high-density recording.

By contrast, the present inventors have discovered that it is possible to enhance the electromagnetic characteristics in the high-density recording region by keeping the squareness in the vertical direction to greater than or equal to 0.65 but less than or equal to 1.00 by increasing the orientation property in the vertical direction (referred to hereinafter as the "vertical orientation property") of hexagonal ferrite powder consisting for the most part (specifically, greater than or equal to 80% based on number of particles) of isotropic particles satisfying relation 1 and having an average particle size of less than or equal to 30 nm. The above magnetic recording medium was devised on this basis.

Although the reason remains unclear—perhaps being due to a crystalline structure—hexagonal ferrite powder tends to have a lower vertical orientation property when the particle shape becomes isotropic, with this tendency becoming stronger as the value of the major axis length/minor axis length decreases. The smaller the particle size becomes, the greater the tendency for the vertical orientation property to drop. Thus, it has conventionally been difficult to achieve a vertical orientation where the squareness in the vertical direction in the magnetic layer is greater than or equal to 0.65 but less than or equal to 1.00 in hexagonal ferrite powder comprised for the most part of isotropic particles satisfying relation 1 above and having an average particle size of less than or equal to 30 nm.

By contrast, the present inventors conducted extensive research which revealed that it was possible to control the squareness in the vertical direction of the magnetic layer containing the above hexagonal ferrite powder to within a range of greater than or equal to 0.65 but less than or equal to 1.00. The means adopted to achieve this will be described further below. The present inventors also discovered that it was possible to achieve good electromagnetic characteristics in the high-density recording region in a magnetic recording medium having such a magnetic layer.

By the way, Examples in Japanese Unexamined Patent Publication (KOKAI) No. 2012-203955, which are expressly incorporated herein by reference in their entirety, disclose that the squareness in the vertical direction of a magnetic layer containing plate-like hexagonal ferrite powder falls within the above range (see Table 1 in the above publication). However, Japanese Unexamined Patent Publication (KOKAI) No. 2012-203955 describes neither hexagonal ferrite powder containing greater than or equal to 80%, based on number of particles, of isotropic particles satisfying relation 1 and having an average particle size of less than or equal to 30 nm, nor means of increasing the vertical orientation property of such hexagonal ferrite powder.

The above are presumptions by the present inventors with regard to the above magnetic recording medium. As mere presumptions, they do not limit the present invention in any way.

In the present invention and present specification, the term "ferromagnetic powder" means an aggregation of multiple ferromagnetic particles. For example, the term "hexagonal ferrite powder" means an aggregation of multiple hexagonal ferrite particles. The term "aggregation" is not limited to forms in which the constituent particles are in direct contact, but includes forms in which binder, additives, or the like is present between the particles. The term "particles" is also sometimes used to denote powder. These points are also applied to the various powders described in the present invention and present specification. Below, hexagonal ferrite powder or hexagonal ferrite particles are sometimes referred to as simply hexagonal ferrite.

In the present invention and present specification, unless specifically stated otherwise, the term "particle size" refers to the major axis length, and the term average particle size refers to the average major axis length. In the present invention and present specification, the average value refers to the arithmetic average. The term "particle size" is a value obtained by observation under a transmission electron microscope. Specifically, it is the average major axis length of the average value of the magnetic axis length of 500 particles when the major axis lengths of 500 particles are obtained from a photograph of particles taken by a direct method employing a transmission electron microscope (for example, a model H-9000 transmission electron microscope made by Hitachi) at an acceleration voltage of 100 kV. More specifically, a photograph of particles is taken at a pickup magnification of 100,000-fold and printed on print paper at a total magnification of 500,000-fold. Target particles are selected within the particle photograph, the contours of the powder are traced with a digitizer, and the major axis length of the particles is measured with image analysis software (for example, the image analysis software KS-400 made by Carl Zeiss). The term "major axis length" refers to the length of the major axis, which is determined as the longest axis (straight line) that can be drawn through the particle. The term "minor axis" is determined as the longest axis that can be drawn for the particle length in the form of a straight line vertical to the major axis. The length of this axis is the minor axis length. However, when the major axis of a particle cannot be specified based on shape, the diameter of an equivalent circle is adopted as the particle size and the average diameter of equivalent circles is adopted as the average particle size. Specifically, it is the average diameter of equivalent circles in the form of the average value of 500 particles when the diameters of equivalent circles are determined from the projected areas of 500 particles in a photograph of particles taken by a direct method employing a transmission electron microscope (for example, a model H-9000 transmission electron microscope made by Hitachi) at an acceleration voltage of 100 kV.

The proportion (based on number of particles) of hexagonal ferrite particles accounted for by isotropic particles satisfying relation 1 above is determined by randomly extracting 500 particles, measuring the major axis length and minor axis length thereof, calculating the ratio (major axis length/minor axis length) thereof, and calculating the proportion of the total number of particles (500) accounted for by the number of isotropic particles satisfying relation 1 among the 500 particles. The methods of measuring the major axis length, minor axis length, and average particle size are determined by the transmission electron microscope observation method set forth above. The average particle size of isotropic particles satisfying relation 1 is the average value of the major axis length (average major axis length) of all of the particles determined to be isotropic particles satisfying relation 1 among the 500 particles the particle size of which has been measured by the above method. The term "coefficient of variation" of the particle size of those isotropic particles satisfying relation 1 is a value (unit: %) obtained by calculating the standard deviation of the major axis length of the particles determined to be isotropic particles, dividing it by the average major axis length of the isotropic particles, and multiplying this result by 100.

The average particle size, major axis length, and minor axis length set forth above can be obtained by observation of the powder under a transmission electron microscope when the powder exists in the form of a powder. However, when the powder is contained in a magnetic recording medium, a measurement sample for collected powder can be obtained from the magnetic recording medium. For example, hexagonal ferrite powder can be collected from the magnetic layer by the method described in paragraph 0025 of Japanese Unexamined Patent Publication (KOKAI) No. 2015-127986, which are expressly incorporated herein by reference in their entirety.

The squareness in the vertical direction is a value that is obtained by measuring the saturation magnetization and residual magnetization in a direction vertical to the magnetic recording medium, and dividing the residual magnetization by the saturation magnetization that has been measured. The term "vertical direction" refers to a direction that is orthogonal to the surface on the magnetic layer side of the magnetic recording medium. In the present invention and present specification, the squareness in the vertical direction of the magnetic layer refers to a value measured for the magnetic field intensity at 1,200 kA/m (15 kOe) without demagnetization correction.

Description relating to angles, such as "orthogonal", in the present specification is to be construed as including the range of error that is permitted in the technical field to which the invention belongs. For example, it means falling within a range of less than ±10° of the precise angle. The error with the precise angle is desirably less than or equal to 5°, preferably less than or equal to 3°.

In one embodiment, the above ferromagnetic powder is hexagonal ferrite powder containing greater than or equal to 90%, based on number of particles, of the above isotropic particles.

In one embodiment, the coefficient of variation in the particle size of the above isotropic particles is less than or equal to 25%.

In one embodiment, the coefficient of variation in the particle size of the above isotropic particles is less than or equal to 20%.

In one embodiment, a compound containing a polyalkyleneimine chain and a polyester chain is incorporated into the magnetic layer.

A further aspect of the present invention relates to a magnetic signal reproduction device containing the above magnetic recording medium and a magnetic reproduction head.

In one embodiment, the magnetic signal reproduction device reproduces with a magnetic reproduction head a magnetic signal that has been recorded at a linear recording density of greater than or equal to 200 kfci on the above magnetic recording medium.

An aspect of the present invention can provide a magnetic recording medium that is capable of reproducing with good electromagnetic characteristics a signal that has been recorded at high density.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
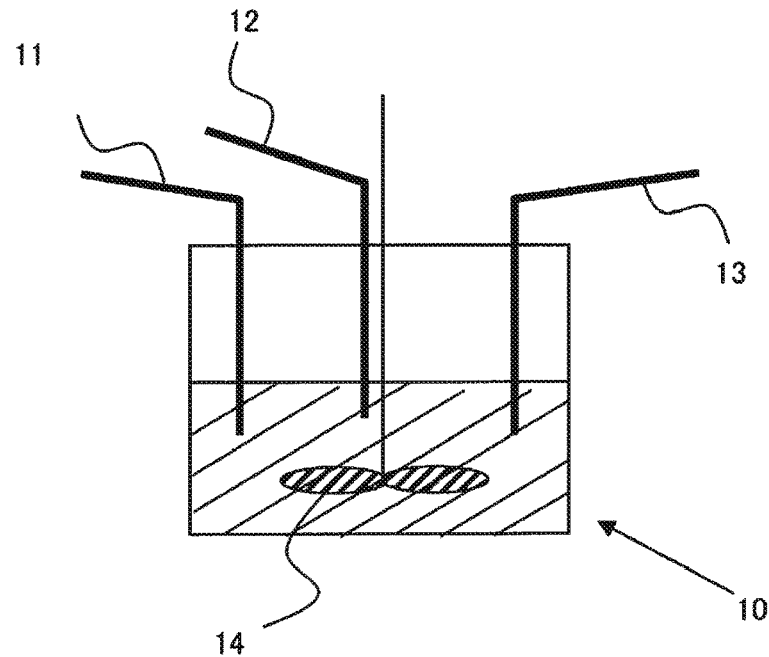
FIG. 1 is a schematic sectional view showing an example of a batch-type reaction tank that can be used to prepare precursor of hexagonal ferrite.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Recording Medium

An aspect of the present invention relates to a magnetic recording medium having a magnetic layer containing ferromagnetic powder and binder on a nonmagnetic support, wherein the ferromagnetic powder is hexagonal ferrite powder containing, based on number of particles, greater than or equal to 80% isotropic particles that satisfy the following relation 1:

major axis length/minor axis length <1.2;
with the average particle size of the hexagonal ferrite powder being less than or equal to 30 nm, and
the squareness in the vertical direction of the magnetic layer being greater than or equal to 0.65 but less than or equal to 1.00.

<Ferromagnetic Powder>
<<Shape and Size>>

The ferromagnetic powder that is contained in the magnetic layer of the above magnetic recording medium is hexagonal ferrite powder that contains greater than or equal to 80%, based on number of particles, of isotropic particles satisfying relation 1 above. Known crystalline structures of hexagonal ferrite include the magnetoplumbite type (M type), W type, Y type, and Z type. The crystalline structure of the hexagonal ferrite particles (ferromagnetic particles) constituting the hexagonal ferrite powder can be any of these crystalline structures. The hexagonal ferrite can be barium ferrite, strontium ferrite, calcium ferrite, lead ferrite, or mixed crystals of two or more of these.

In the above hexagonal ferrite powder, hexagonal ferrite particles in the form of isotropic particles that satisfy relation 1 above account for greater than or equal to 80% based on the number of particles. The magnetic recording medium having a magnetic layer that contains, based on number of particles, greater than or equal to 80% of isotropic particles satisfying relation 1 above, and in which hexagonal ferrite powder with an average particle size of less than or equal to 30 nm is vertically oriented to achieve a squareness in the vertical direction of greater than or equal to 0.65 and less than or equal to 1.00, can afford good electromagnetic characteristics in the high-density recording region. This point was brought to light for the first time as a result of extensive research conducted by the present inventors.

In the above hexagonal ferrite powder, the proportion accounted for by the isotropic particles that satisfy relation 1 above is, based on number of particles, greater than or equal to 80%, desirably greater than or equal to 85%, and preferably, greater than or equal to 90%. This proportion can be, for example, less than or equal to 98% or less than or equal to 95%. However, from the perspective of enhancing electromagnetic characteristics, the higher the better. These values are thus not limits; 100 is also possible.

Each of the particles that satisfy relation 1 above can be a particle for which the value of the major axis length divided by the minor axis length is 1 (that is, a spherical particle the major axis length of which is equal to the minor axis length), or can be a particle the major axis length of which is greater than the minor axis length, that is, that satisfies: 1<major axis length/minor axis length <1.2. Since many (greater than or equal to 80% based on number of particles) of the particles constituting the above hexagonal ferrite powder are isotropic particles that satisfy relation 1 above, the above hexagonal ferrite powder can be considered to have a particle shape with little variation. As regards variation in particle size, it is desirable for there to be little variation in the particle size of the isotropic particles that satisfy relation 1 above from the perspective of enhancing the magnetic characteristic of the hexagonal ferrite powder. In this regard, the coefficient of variation in the particle size of the isotropic particles satisfying relation 1 above that are contained in the above ferromagnetic powder is desirably less than or equal to 30%, preferably less than or equal to 25%, and more preferably, less than or equal to 20%. The coefficient of variation in particle size of the isotropic particles that satisfy relation 1 above can be, for example, greater than or equal to 10% greater than or equal to 15%, or lower than these since the lower it is, the better.

Further, in the hexagonal ferrite particles that constitute the hexagonal ferrite powder, the shape of the particles that do not correspond to isotropic particles satisfying relation 1 above is not limited, and can thus be isotropic or plate-like.

The average particle size of the hexagonal ferrite powder containing greater than or equal to 80%, based on number of particles, of isotropic particles satisfying relation 1 above is less than or equal to 30 nm. From the perspective of high-density recording, the smaller the average particle size of the ferromagnetic powder contained in the magnetic layer the better. In this regard, the average particle size of the above hexagonal ferrite powder is desirably less than or equal to 25 nm, preferably less than or equal to 20 nm, and more preferably, less than or equal to 18 nm. From the perspective of magnetization stability, the average particle size of the above hexagonal ferrite powder is desirably greater than or equal to 10 nm. From the same perspective, the average particle size of the isotropic particles satisfying relation 1 above is desirably less than or equal to 30 nm, preferably less than or equal to 25 nm, more preferably less than or equal to 20 nm, and preferably, greater than or equal to 10 nm.

<<Magnetic Characteristics>>

The magnetic characteristics of the ferromagnetic powder (the above hexagonal ferrite powder) contained in the magnetic layer of the above magnetic recording medium will be described next. However, it suffices for the ferromagnetic powder that is contained in the magnetic layer of the above magnetic recording medium to be hexagonal ferrite powder containing, based on number of particles, greater than or equal to 80% of isotropic particles satisfying relation 1. They can also lack the following magnetic characteristics.

The saturation magnetization of the above hexagonal ferrite powder is desirably greater than or equal to 30 $A \cdot m^2/kg$, preferably greater than or equal to 33 $A \cdot m^2/kg$, and still more preferably, greater than or equal to 35 $A \cdot m^2/kg$. Generally, the smaller the average particle size of a ferromagnetic powder, the lower the saturation magnetization tends to be. Although the above hexagonal ferrite powder has an average particle size of less than or equal to 30 nm, it can exhibit a saturation magnetization falling within the above range. The present inventors presume this to be because many (greater than or equal to 80% based on number of particles) isotropic particles satisfying relation 1 above are contained. From the perspective of reducing noise, the saturation magnetization is desirably less than or equal to 80 $A \cdot m^2/kg$, preferably less than or equal to 60 $A \cdot m^2/kg$.

From the perspective of magnetization stability, the coercive force of the above hexagonal ferrite powder is desirably greater than or equal to 159 kA/m (greater than or equal to 2,000 Oe), preferably greater than or equal to 199 kA/m (greater than or equal to 2,500 Oe). From the perspective of facilitating recording (ease of writing), the coercive force is desirably less than or equal to 318 kA/m (less than or equal to 4,000 Oe), preferably less than or equal to 279 kA/m (less than or equal to 3,500 Oe).

The above magnetic characteristics can be determined using a known measuring device capable of measuring magnetic characteristics, for example, a vibrating sample magnetometer. Specific examples of the measurement methods are given in Examples further below.

<<Method of Manufacturing Ferromagnetic Powder (Hexagonal Ferrite Powder)>>

The above hexagonal ferrite powder can be manufactured by a known method of manufacturing hexagonal ferrite powder, such as the coprecipitation method, reverse micelle method, hydrothermal synthesis method, and glass crystallization method. Embodiments of desirable manufacturing methods are given below as regards manufacturing methods based on the hydrothermal synthesis method, but the present invention is not limited to the following embodiments.

The hydrothermal synthesis method is a method for converting a hexagonal ferrite precursor into hexagonal ferrite powder by heating a water-based solution containing a hexagonal ferrite precursor. Among such methods, the continuous hydrothermal synthesis method of heating and pressurizing a water-based fluid containing a hexagonal ferrite precursor while causing the liquid to move to a reaction flow passage, and using water that is being heated and pressurized (also referred to as "high-temperature, high-pressure water" hereinafter), desirably highly reactive water in a subcritical to supercritical state, to convert the hexagonal ferrite precursor to ferrite is desirable from the perspective of facilitating the obtaining of small hexagonal ferrite particles.

In the continuous hydrothermal synthesis method, examples of specific methods for controlling the shape and size of the hexagonal ferrite powder that is obtained are:
(1) inhibiting fluctuation in the pH of the reaction system during the preparation of the hexagonal ferrite precursor;
(2) conducting preparation of the hexagonal ferrite precursor in a continuous manufacturing process;
(3) conducting the reaction converting the hexagonal ferrite precursor into hexagonal ferrite in the presence of a reducing compound;
(4) controlling the solution temperature at the point of first contact of the high-temperature, high-pressure water, hexagonal ferrite precursor, and organic compound, described further below; and
(5) controlling the pH of the reaction system in which is conducted the reaction converting hexagonal ferrite precursor into hexagonal ferrite. By conducting one or any combination of two or more of these, it is possible to obtain hexagonal ferrite powder containing greater than or equal to 80%, based on number of particles, of isotropic particles that satisfy relation 1 above and have an average particle size of less than or equal to 30 nm.

The above specific methods will be further described in the detailed description of the continuous hydrothermal synthesis method below.

(Preparation of Hexagonal Ferrite Precursor)
(i) Starting Materials (Iron Salt, Divalent Metal Salt), Base, Water-Based Solvent The hexagonal ferrite precursor need only be a compound that can convert to hexagonal ferrite (ferrite conversion) when placed in the presence of high-temperature, high-pressure water. The high-temperature, high-pressure water refers to water that is heated and pressurized. The details are given further below. The precursor can exhibit high solubility in water and dissolve in the aqueous based solvent described further below, or can have poor solubility in water and can be dispersed (in sol form) as colloidal particles in the water-based solution.

Crystal structures of hexagonal ferrite are set forth above. For example, M-type hexagonal ferrite not containing substitution atoms is a metal oxide denoted by $AFe_{12}O_{19}$. A denotes a divalent metal atom. The term "divalent metal atom" refers to a metal atom that is capable of becoming an ion in the form of a divalent cation. This includes alkaline earth metal atoms such as barium, strontium, and calcium, as well as lead and the like. The hexagonal ferrite may contain one or more substitution atoms that are substituted for a portion of the divalent metal atoms. When obtaining such hexagonal ferrite, it suffices to use a salt containing a substituent atom together with a divalent metal salt. Examples of atoms that can be substituted for divalent metal atoms are any of the atoms given further below. However, there is no limitation thereto.

The hexagonal ferrite precursor set forth above can be obtained by mixing an iron salt and a divalent metal salt in a water-based solution, desirably in a water-based solution containing a base. In this water-based solution, a salt containing iron atoms and divalent metal atoms (for example, a hydroxide) will precipitate in particle form, desirably as colloidal particles. The particles that precipitate out here can be subsequently placed in the presence of high-temperature, high-pressure water to convert them to ferrite and obtain hexagonal ferrite.

Salts of alkaline earth metals such as barium, strontium, and calcium, as well as lead salts can be employed as divalent metal salts. The type of divalent metal atom can be determined based on the desired hexagonal ferrite. For example, when barium ferrite is desired, a divalent metal salt in the form of a barium salt is employed. When strontium ferrite is desired, a strontium salt is employed. When mixed crystals of barium ferrite and strontium ferrite are desired, it suffices to employ divalent metal salts in the form of a barium salt and a strontium salt in combination. The salt is desirably a water-soluble salt. For example, hydroxides; halides such as chlorides, bromides, and iodides; and nitrates can be employed. Hydrates can also be employed.

Water-soluble salts of iron, such as halides such as chlorides, bromides, and iodides; nitrates; sulfates; carbonates; organic acid salts; and complexes can be employed as the iron salt. Hydrates can also be employed. The blending ratio and quantities added of the iron salt and divalent metal salt can be determined in accordance with the desired ferrite composition. In addition to an iron salt and a divalent metal salt, salts of optional atoms that are capable of constituting hexagonal ferrite along with iron atoms and divalent metal atoms can also be added. Examples of such optional atoms are Nb, Co, Ti, and Zn. The quantities of salts of these optional atoms that are added can be determined in accordance with the desired ferrite composition.

A hexagonal ferrite precursor containing the atoms that were contained in these salts will precipitate when the salts set forth above are mixed with a water-based solution desirably containing a base. Primarily hydroxide ions ($OH^-$) in the water-based solution containing a base are thought to form a hydroxide sol with the iron ions contained in the iron salt and divalent metal ions contained in the divalent metal salt, thereby forming the precursor. The precursor that precipitates out here is subsequently converted to hexagonal ferrite (ferrite conversion).

In the present invention, the base refers to one or more bases as defined by one or more among Arrhenius, Bronsted, or Lewis (Arrhenius bases, Bronsted bases, or Lewis bases). The same applies to the acids described in greater detail below; they are defined as one or more acids as defined by Arrhenius, Bronsted, or Lewis (Arrhenius acids, Bronsted acids, or Lewis acids).

Specific examples of bases are sodium hydroxide, potassium hydroxide, sodium carbonate, and ammonia water. However, there is no limitation thereto. Nor is there a limitation to inorganic bases; organic bases can also be employed.

Some of the salts that are added along with the base will sometimes exhibit acidity. Thus, when the water-based solution for preparing the precursor contains a base, the pH of the water-based solution is not limited to being alkaline, and will sometimes be neutral or acidic. The pH of the water-based solution is, for example, equal to or higher than 4.00 but equal to or lower than 14.00, as the pH at the solution temperature during preparation of the precursor (during the reaction). From the perspective of getting the reaction to progress smoothly to prepare the precursor, equal to or higher than 5.00 but equal to or lower than 14.00 is desirable, equal to or higher than 6.00 but equal to or lower than 13.00 is preferred, and equal to or higher than 6.00 but equal to or lower than 12.00 is of still greater preference. Having a pH of equal to or higher than 7.00 or exceeding 7.00 (neutral to alkaline) is even more preferable. The temperature of the water-based solution during the reaction can be controlled by heating or cooling, or can be left unregulated at room temperature. The solution temperature desirably falls within a range of 10 to 90° C. The reaction can progress adequately without temperature control (for example, at about 20 to 25° C.). To control the temperature, the reaction tank described further below can be equipped with heating or cooling means. The feed passage described further below can also be heated with a heating means or cooled with a cooling means to regulate the temperature.

The water-based solvent refers to solvent containing water. Water alone will do, as will a mixed solvent of water and an organic solvent. The water-based solvent that is employed to prepare the precursor desirably comprises equal to or more than 50 weight percent of water, and is preferably water alone.

An organic solvent that is miscible with water or hydrophilic is desirable as the organic solvent that is combined with water in the water-based solvent. For this reason, a polar solvent is suitably employed. The term "polar solvent" refers to a solvent that either has a dielectric constant of greater than or equal to 15 or a solubility parameter of greater than or equal to 8, or both. Examples of desirable organic solvents, including alcohols, are the organic solvents described in paragraph 0037 of Japanese Unexamined Patent Publication (KOKAI) No. 2015-127986.

(ii) Reducing Compound

The reaction converting the hexagonal ferrite precursor prepared as set forth above to hexagonal ferrite can be conducted in the presence of a reducing compound selected from the group consisting of reducing organic compounds and reducing inorganic compounds. In an embodiment, the hexagonal ferrite precursor can be prepared in the presence of a reducing compound. For example, in one specific embodiment, the reducing compound can be mixed along with the starting material, base, and water-based solvent during preparation of the precursor. Placing the reducing compound in the water-based solution to prepare the precursor makes it possible to cause the reducing compound to be present at a minimum either on the surface of the precursor or in the interior thereof. Here, the term "reducing" means either having the ability to add a hydrogen atom to another compound, or the ability to donate an electron, or both. The reducing compound is desirably a compound that exists as a solid or liquid at ordinary temperature and pressure. Existing as a solid or a liquid at ordinary temperature and ordinary pressure means existing as a solid or liquid at least at 25° C. and 1 atmosphere (about 1013.25 hPa), and includes existing in a mixed solid/liquid state. The use of a compound that exists as a solid or liquid at ordinary temperature and ordinary pressure as the reducing compound is desirable to increase the degree of uniformity in the state (for example, a state of adhesion to a surface) in which the reducing compound is present in the precursor. From the perspective of processing safety, as well, a compound that exists as a solid or a liquid at ordinary temperature and pressure is desirable.

Specific examples of reducing compounds are: sodium borohydride, lithium borohydride, and other hydride compounds; aldehydes such as formalin and acetaldehyde; sulfites; carboxylic acids such as formic acid, oxalic acid, succinic acid, and ascorbic acid; lactones; aliphatic monoalcohols such as ethanol, butanol, and octanol; alicyclic monoalcohols such as terpineols; other monoalcohols; ethylene glycol, propylene glycol, diethylene glycol, dipropylene glycol, and other aliphatic diols; polyhydric alcohols such as glycerol and trimethylol propane; polyethers such as polyethylene glycol and polypropylene glycol; alkanol amines such as diethanol amine and monoethanol amine; hydroquinone; resorcinol; aminophenol; glucose; sodium citrate; and hypochlorous acid and its salts. Those of the organic compounds given further below that exhibit a reducing property, desirably those that exist as solids or liquids at ordinary temperature and ordinary pressure, can also be used as reducing compounds. Desirable examples of reducing compounds are hydrazine compounds and amino compounds.

Among the hydrazine compounds are included hydrazine ($NH_2$—$NH_2$), substituted hydrazine derivatives obtained by substituting a substituent for one or more of the four hydrogen atoms of hydrazine, and hydrates and salts thereof. In the present invention and the present specification, examples of substituents are linear, branched, and cyclic alkyl groups (such as alkyl groups having 1 to 6 carbon atoms), alkoxy groups (such as alkoxy groups having 1 to 6 carbon atoms), halogen atoms (such as fluorine, chlorine, and bromine atoms), aryl groups (such as phenyl groups), and heteroaryl groups. Specific examples of desirable hydrazine compounds are: hydrazine, hydrazine monohydrate, hydrazine carbonate, hydrazinium sulfate, phenyl hydrazine, 1-methyl-1-phenyl hydrazine, and 1,1-diphenylhydrazine hydrochloride.

The amine compound can be a primary amine, secondary amine, or tertiary amine. The structure can contain a cyclic structure. Specific examples of amine compounds are triethylamine, triethanolamine, and dimethylaminoethanol. The organic amines that can be employed as an organic compound set forth further below can also be employed.

When mixing in a reducing compound when preparing the precursor, equal to or more than 2 molar parts are desirably added, equal to or more than 5 molar parts are preferably added, equal to or more than 10 molar parts are more preferably added, equal to or more than 20 molar parts are still more preferably added, equal to or more than 30 molar parts are even more preferably added, equal to or more than 40 parts are even still more preferably added, and equal to or more than 50 parts are yet still more preferably added per 100 molar parts of precursor starting materials combined in the form of iron salt and divalent metal salt. The quantity added is desirably equal to or less than 300 molar parts, preferably equal to or less than 250 molar parts, more preferably equal to or less than 200 molar parts, still more preferably equal to or less than 150 molar parts, and yet still more preferably, equal to or less than 100 molar parts.

(iii) Organic Compound

The above precursor can be prepared in the presence of an organic compound (either reducing or nonreducing). It is thought that a precursor that is prepared in the presence of an organic compound can convert to hexagonal ferrite (be subjected to the conversion reaction) in a state that is surface coated with the organic compound, and crystallize following instantaneous dissolution in a reaction system in which high-temperature, high-pressure water is present, resulting in precipitation (conversion to hexagonal ferrite) of hexagonal ferrite in the form of particles. The presence of the organic compound in the vicinity of the particles during the period from dissolution to crystallization is presumed by the present inventor to contribute to reducing the size of the precipitating hexagonal ferrite particles, rendering the particle size uniform, and controlling their shape. Preparing the precursor in the presence of an organic compound is thought by the present inventors to inhibit aggregation of the precursor, reduce the size of the particles, and contribute to obtaining a precursor of good uniformity of particle size, and thus contribute to obtaining hexagonal ferrite with smaller particles and better uniformity of particle size.

Examples of organic compounds are organic carboxylic acids (such as fatty acids and fatty acid salts such as oleic acid and its salts), organic nitrogen compounds, organic sulfur compounds, organic phosphorus compounds and their salts, surfactants, and various polymers. In the present invention and present specification, the term "polymer" refers to polymer of a single compound or two or more different compounds, and can be homopolymer or copolymer. Polymer with a weight average molecular weight of about 1,000 to about 100,000 is suitable, and one exhibiting solubility in water is desirable. Examples of desirable polymers are nonionic polymers and hydroxyl group-containing polymers. Alkali metal salts are suitable as the above salt. In the present invention and present specification, the term "weight average molecular weight," unless specifically stated otherwise, refers to a value that is measured under the following conditions by gel permeation chromatography (GPC) and converted to a polystyrene equivalent.

GPC device: HLC-8120 (made by Tosoh)

Column: TSK gel Multipore HXL-M (7.8 mm inner diameter (ID)×30.0 cm, made by Tosoh)

Eluent: Tetrahydrofuran (THF)

Reference can be made to paragraphs 0056 to 0063 of Japanese Unexamined Patent Publication (KOKAI) No. 2015-127986, for details regarding the above organic compounds.

Examples of the above organic compounds are compounds containing a polyalkyleneimine chain and a polyester chain (also referred to as "polyalkyleneimine-polyester polymers" hereinafter). In one embodiment, the proportion of the polyalkyleneimine-polyester polymer accounted for by polyalkyleneimine chains (also referred to as the "polyalkyleneimine chain ratio" hereinafter) is desirably less than 5.0 weight % and the compound is desirably one in which the number average molecular weight of the polyalkyleneimine chain falls within a range of 300 to 3,000. In another embodiment, the polyalkyleneimine-polyester polymer has a weight average molecular weight of less than or equal to 40,000, desirably less than or equal to 35,000, and preferably less than or equal to 34,000, and the compound is desirably one in which the proportion of the polymer accounted for by the polyalkyleneimine chain is less than 5.0 weight %. Reference can be made to paragraphs 0026 to 0070 of Japanese Unexamined Patent Publication (KOKAI) No. 2015-28830, for details regarding such compounds (polyalkyleneimine-polyester polymers). The average molecular weight (number average molecular weight and weight average molecular weight of the polymer or polymer chain contained in the polymer) of the polyalkyleneimine-polyester polymer is a value determined by the method described in Japanese Unexamined Patent Publication (KOKAI) No. 2015-28830.

Based on research conducted by the present inventors, it has been discovered that by taking the above polyalkyleneimine-polyester polymer and:

(1) employing it as the above organic compound when preparing the precursor;
(2) employing it in the reaction converting the precursor into hexagonal ferrite as set forth in detail further below;
(3) employing it as a component in the magnetic layer; or
(4) employing it in two or more among (1) to (3) above, it is possible to increase the vertical orientation property of hexagonal ferrite powder containing greater than or equal to 80%, based on number of particles, of isotropic particles satisfying relation 1 above and having an average particle size of less than or equal to 30 nm; and keep the squareness in the squareness in the vertical direction of the magnetic layer containing the hexagonal ferrite powder to greater than or equal to 0.65 but less than or equal to 1.00. Although the reason is unclear, the present inventors presume that the polyalkyleneimine-polyester polymer can either play a role of preventing obstruction of the rotation of isotropic particles that satisfy relation 1 above in the magnetic layer to which a magnetic field is applied while it is still wet in the orientation treatment, or a role of making it difficult for the isotropic particles that satisfy relation 1 above to move during the period from the end of application of the magnetic field to drying of the magnetic layer, or both. However, this presumption is not to be construed as limiting the present invention in any way.

By the way, Japanese Unexamined Patent Publication (KOKAI) No. 2015-28830 described above discloses a compound that is included among polyalkyleneimine-polyester polymers. However, the above publication provides no description that would suggest that this compound can contribute to enhancing the vertical orientation of hexagonal ferrite powder containing greater than or equal to 80%, based on number of particles, of isotropic particles satisfying relation 1 above and having an average particle size of less than or equal to 30 nm. The fact that the vertical orientation of the above hexagonal ferrite powder can be enhanced by a polyalkyleneimine-polyester polymer and the fact that enhancing the vertical orientation of the above hexagonal ferrite powder can allow a magnetic recording medium having a magnetic layer with a squareness in the squareness in the vertical direction of greater than or equal to 0.65 but less than or equal to 1.00 to exhibit good electromagnetic characteristics in the high-density recording region were discovered as a result of extensive research by the present inventors.

The quantity of the above organic compound that is employed during preparation of the precursor desirably falls within a range of 0.01 to 1,000 weight parts, preferably within a range of 0.05 to 500 weight parts, and more preferably within a range of 0.1 to 300 weight parts per 100 weight parts of precursor. In the present invention and present specification, the value given with the quantity of precursor as reference is the theoretical yield as determined based on a measured value or the quantity of starting materials charged.

(Mixing the Above Components)

The sequence of mixing the starting materials, base, reducing compound added as needed, and organic compound during preparation of the precursor is not specifically limited. These components can be added to the water-based solvent in any order, two or more of them can be simultaneously mixed in, or all of them can be simultaneously mixed in. In an embodiment, the mixing is conducted in a reaction tank. In the reaction tank, a known stirring means such as a magnetic stirrer is normally used to stir and mix the water-based solution containing the water-based solvent and the above components. In another embodiment, the precursor is prepared in a continuous manufacturing process. The precursor is desirably prepared by converging a feed passage to which the solution containing the iron salt and divalent metal salt is being fed with a feed passage to which the base-containing water-based solution is being fed to mix the two solutions.

In an embodiment, the precursor preparing step can be conducted while continuously feeding the starting materials to the reaction tank. Feeding the starting materials continuously instead of all at once to the reaction tank in this manner is thought to contribute to the smooth progression of the reaction to prepare the precursor. The present inventor presumes that this can prevent coarsening of the precursor obtained and contribute to reducing the particle size of the hexagonal ferrite that is obtained from the precursor. From the perspective of uniformly mixing the starting material being fed, it is desirable for the reaction tank to contain at least water-based solvent prior to the start of the continuous feeding period (referred to as the "continuous feed period" hereinafter). The details regarding the water-based solvent are as set forth above. The water-based solvent in the reaction tank at the start of continuous feeding can contain one or more selected from the group consisting of iron salts, divalent metal salts, and bases. To fully achieve the effect of continuously feeding the starting material, it is desirable for the iron salt and base to not both be present in the solution (solution prior to the reaction) in the reaction tank prior to the start of the continuous feed period. This is mainly because the hydroxide that is formed by iron ions and hydroxide ions is of poor solubility in water-based solvent, so it is highly probable that the formation of precipitate will begin when both an iron salt and a divalent metal are present. Additionally, since the solubility in water-based solvent of the hydroxide that is formed by divalent metal ions and hydroxide ions is relatively high, the probability of a precipitate forming is low even when both a divalent metal salt and a base are present. Accordingly, a divalent metal salt and a base can both be present in the solution before the reaction. The pH can be adjusted with an acid or a base prior to the start of continuous feeding. The base that is employed here is as set forth above. Any of the acids known to be used to adjust pH, such as hydrochloric acid, nitric acid, and sulfuric acid, can be used without restriction as the acid. Organic acids as well as inorganic acids can also be employed as the acid.

In an embodiment, the reaction tank is a batch-type reaction tank, and in another embodiment, it is a continuous-type reaction tank. With a batch-type reaction tank, the removal of the reaction product is conducted in a separate step from feeding of the starting materials and the reaction. With a continuous-type reaction tank, removal of the product is conducted in parallel with feeding of the starting materials and the reaction. Accordingly, a continuous-type reaction tank will be equipped with at least one feed flow passage and at least one discharge flow passage. The above manufacturing method can be conducted using either of these reaction tanks. An embodiment employing a batch-type reaction tank and an embodiment employing a continuous-type reaction tank will be specifically described below with reference to the drawings. However, the present invention is not limited to these specific embodiments.

FIG. 1 is a schematic sectional view showing an example of a batch-type reaction tank that can be used to prepare precursor. The batch-type reaction tank 10 shown in FIG. 1 is equipped with feed passages 11, 12, and 13 that feed starting materials to the reaction tank. Each feed passage is connected to a starting material storage tank, not shown. The starting materials in the starting material storage tanks are normally fed to the reaction tank by feed pumps, not shown, in the form of solutions. By varying the flow rate of the feed pumps, it is possible to control the quantity of starting material fed. The iron salt, divalent metal salt, and base are fed to the reaction tank over these three feed passages, respectively. FIG. 1 shows a reaction tank equipped with three feed passages. An embodiment is shown in which an iron salt, a divalent metal salt, and a base are each fed to the reaction tank over a separate feed passage. However, it is also possible for the iron salt and the divalent metal salt to be mixed and then fed to the reaction tank over the same feed passage. Additionally, the base can be desirably fed over a separate feed passage from the starting materials to inhibit variation in the pH of the reaction liquid in the reaction tank. That is because the quantity of base that is fed can be independently established and adjusted from the quantities of starting materials fed. This point also applies to the embodiment employing a continuous-type reaction tank. In the embodiment shown in FIG. 1, since the base is fed over a feed passage separate from that of the iron salt and divalent metal salt, no base is added to the feed materials that are fed over the other feed passages (for example, iron salt and divalent metal salt, or a mixture of iron salt and divalent metal salt).

The batch-type reaction tank 10 shown in FIG. 1 is equipped with stirring vanes 14 in addition to the above feed passages. Stirring the starting materials while they are being fed can prevent a nonuniformity in pH from developing in the portion close to the discharge outlet of the feed passage and the portion far from it in the reaction liquid, and render the pH of the reaction liquid in the reaction tank uniform. The method of stirring is not limited to methods based on stirring vanes; any type of stirring method, such as a magnetic stirrer or static mixer, can be used without restriction. The stirring conditions, such as the peripheral speed of the stirring vanes, are not specifically limited.

The iron salt, divalent metal salt, and base can be fed in a solid state or in a liquid state. To facilitate achieving uniformity during mixing in the reaction tank, it is desirable to add them as liquids; for example, in the form of water-based solutions obtained by dissolving or dispersing them in suitable water-based solvent. The concentration of the salt or base in the water-based solution can be suitably set.

Feeding of the iron salt, divalent metal salt, and base can begin simultaneously for all three, or can be begun in any sequence. The point in time when both the iron salt and the base are present in the reaction liquid in the reaction tank is considered the start of the continuous feed period and the point in time when feeding of all of the starting materials stops is considered the end of the continuous feed period. The "point in time when both the iron salt and the base are present in the reaction liquid in the reaction tank" can be the point in time when feeding of either the iron salt or the base begins to a prereaction solution containing the other, the point in time when feeding of the iron salt and the base simultaneously beings to a prereaction solution not containing neither iron salt nor base, the point in time when feeding of either the iron salt or the base has been begun in advance to a prereaction solution containing neither iron salt nor base and feeding of the other begins, or the like. In the present invention, the term "simultaneously" as regards the starting of feeding and the stopping of feeding includes cases where the starting times are unintentionally skewed due to the operational precision of the devices or the like.

Feeding of the divalent metal salt to the reaction tank can begin at any stage. For example, feeding of the divalent metal to the reaction tank can begin before or after feeding of the iron salt or base, during the period between the start of feeding of one of the two and the start of feeding of the other, or the like. Feeding of the starting materials during the continuous feed period can be conducted by continuing the usual feeding (continuous feeding), or can be conducted by repeatedly starting and stopping feeding (intermittent feeding). Continuous feeding is desirable from the perspective of precisely and readily controlling the feeding of those starting materials the quantity of which being fed per unit time is subjected to controls.

Either feed quantity controls that control the quantity being fed per unit time of at least one from among the iron salt, divalent metal salt, and base during the continuous feed period, or the addition of an acid to the reaction liquid in the reaction tank, is desirably conducted based on the $pH_{before}$, which is the pH of the solution in the reaction tank prior to the start of the continuous feed period (prereaction solution), so that the pH of the reaction liquid in the reaction tank during the continuous feed period remains within the range of:

$$pH_{before}-2.00 \leq pH \leq pH_{before}+2.00.$$

Feed quantity controls alone, or acid addition alone, can be conducted, or feed quantity controls and acid addition can be conducted in parallel. They can be conducted in any order and with any type of repetition.

The above quantity being fed per unit time is not specifically limited. For example, it can refer to the quantity being fed per any interval, such as the quantity being fed per hour, the quantity being fed per minute, or the quantity being fed per second. For liquids, the quantity being fed per unit time can be denoted as a flow rate. Gradual mixing in by providing a continuous feed time, without mixing in the entire quantity of starting materials at once during the preparation of the precursor, is thought to primarily contribute to reducing the particle size of the hexagonal ferrite that is obtained by converting the precursor that is thus prepared. Controlling the pH of the reaction liquid in the reaction tank during the continuous feed period is presumed by the present inventor to contribute to rendering uniform the particle shape and particle size of the hexagonal ferrite obtained by converting the precursor thus prepared. This is thought by the present inventor primarily to be due to the high dependence on pH of the solubility of the starting materials, particularly the solubility of the iron salt. In this context, the term "controlling the quantity being fed per unit time" refers to changing the quantity being fed per unit time, that is, increasing it or decreasing it, increasing it and then decreasing it, or decreasing it and then increasing it, at least once. This increasing and decreasing can be continuously conducted or conducted in stages. The degree of increasing or decreasing (that is, the rate of the increase or the rate of the decrease of the quantity being fed) can be any adjustment so long as the fluctuation in pH is kept to within the desired range.

The addition of an acid is desirably done over a feed passage separate from that of the starting materials, and can be done continuously, intermittently, or all at once. The acid is as set forth above. To precisely and readily control the pH, the acid is desirably fed as a liquid, but there is no specific limitation.

In an embodiment, to keep the pH fluctuation within a desired range during the continuous feed period by controlling the quantities fed and adding an acid, the pH of the reaction liquid in the reaction tank is desirably constantly monitored during the continuous feed period. It is also possible to keep the pH fluctuation in the reaction liquid in the reaction tank within the desired range by feeding back the monitoring results to the feed pump operating conditions (feedback control) by means of a known control program. So long as the pH is kept to within the desired range during the continuous feed period, the quantity of starting materials being fed per unit time is not specifically limited and can be suitably determined by taking productivity and the like into account. The same applies to the quantity of acid added.

The pH of the reaction liquid in the reaction tank during the continuous feed period preferably falls within the range of:

$$pH_{before}-1.50 \leq pH \leq pH_{before}+1.50;$$

more preferably falls within the range of:

$$pH_{before}-1.00 \leq pH \leq pH_{before}+1.00;$$

and still more preferably falls within the range of:

$$pH_{before}-0.50 \leq pH \leq pH_{before}+0.50$$

In an embodiment, it is desirable to control the quantity of the base, which can be the main cause of pH fluctuation, being fed per unit time. In that case, the quantity of iron salt being fed per unit time and the quantity of divalent metal salt being fed per unit time can be varied or can be left unvaried. In an embodiment, from the perspective of rendering the reaction uniform, the quantities of iron salt and divalent metal salt being fed per unit time are desirably not varied during the continuous feed period. In another embodiment, the quantity of iron salt or of divalent salt, or both, being fed per unit time can be changed without changing the quantity of base being fed per unit time.

In an embodiment employing a batch-type reaction tank, following the end of the continuous feed period, after optionally continuing stirring and mixing, the precursor-containing aqueous solution that is removed from the reaction tank is subjected to the preparation of hexagonal ferrite by a continuous hydrothermal synthesis method to convert the precursor to hexagonal ferrite. In an Embodiment A feed pipe is mounted on a batch-type reaction tank and the precursor-containing aqueous solution is directly fed to the reaction device conducting preparation of hexagonal ferrite by a continuous hydrothermal synthesis method from the batch-tape reaction tank via the feed pipe. In yet another embodiment, precursor-containing aqueous solution removed from a batch-type reaction tank is moved to a liquid tank where preparation of hexagonal ferrite is being conducted by a continuous hydrothermal synthesis process, after which the precursor is converted to hexagonal ferrite by the continuous hydrothermal synthesis process. The details of the continuous hydrothermal synthesis method are set forth further below.

The above description sets forth an embodiment of continuously feeding an iron salt, a divalent metal salt, and a base to a batch-type reaction tank. However, the feeding to the reaction tank during the continuous feed period is not limited to these three starting materials. For example, neutral water containing no acid or base, such as pure water or distilled water, and the above-described reducing compound and organic compound can also be fed to the reaction tank during the continuous feed period. The quantities of these optionally fed components being fed per unit time can be suitably set. In order to inhibit pH fluctuation in the reaction tank during the continuous feed period by controlling the quantities of starting materials added to the reaction tank as essential components per unit time, the quantities of optional components that are fed per unit time during the continuous feed period can be varied or can be maintained constant without being varied.

An embodiment employing a continuous-type reaction tank will be described next.

Figure 2:
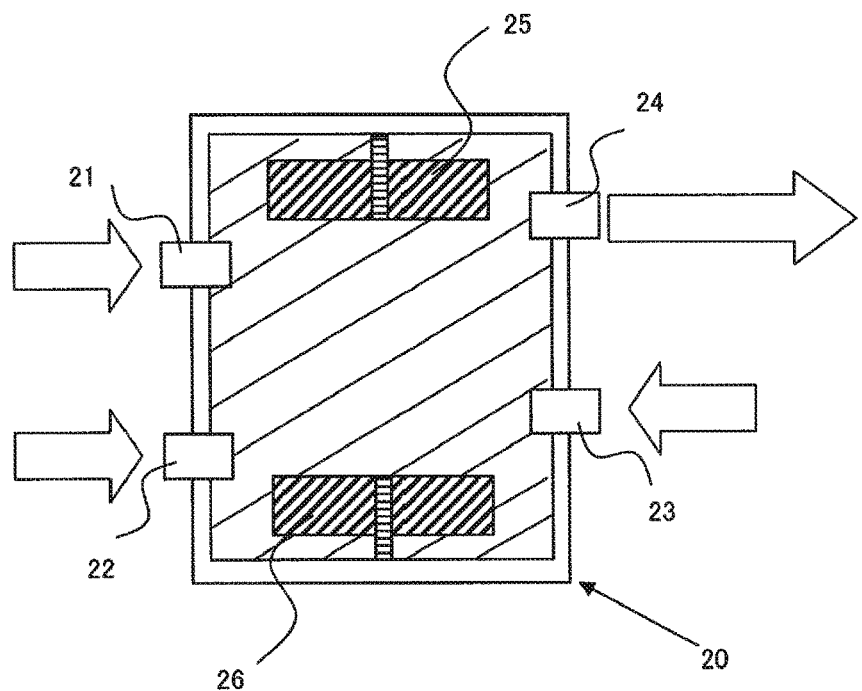
FIG. 2 is a schematic sectional view showing an example of a continuous-type reaction tank that can be used to prepare precursor of hexagonal ferrite.

FIG. 2 is a schematic sectional view showing an example of a continuous-type reaction tank that can be used to prepare a precursor-containing water-based solution. The continuous-type reaction tank 20 shown in FIG. 2 is equipped with feed passages 21, 22, and 23 feeding starting materials to the reaction tank. Each feed passage is connected to a starting material storage tank, not shown. In the feeding to the continuous-type reaction tank shown in FIG. 2, the starting materials in the starting material storage tanks are normally fed to the reaction tank by a feed pump, not shown, in the form of solutions. By changing the flow rate with the feed pump, it is possible to control the quantity of starting materials fed. Here, continuous-type reaction tank 20 is filled with prereaction solution prior to the start of the continuous feed period. The prereaction solution is as set forth above. In an embodiment, iron salt, divalent metal salt, and base are respectively fed to the reaction tank over three feed passages. It is desirable to feed at least the base to the reaction tank over a separate feed passage from the iron salt and divalent metal salt; it is also possible to mix the iron salt and divalent metal salt and then feed them to the reaction tank over the same feed passage. As set forth above, water, a reducing compound, and an organic compound can be fed to the reaction tank during the continuous feed period.

The continuous-type reaction tank shown in FIG. 2 is equipped with upper and lower stirring vanes 25 and 26 within the reaction tank. The rotation of stirring vanes 25 and 26 is driven by a motor, not shown, to stir and mix the reaction liquid within the reaction tank. The stirring vanes can be linked directly to the motor, or can be magnetically coupled. Either set of the stirring vanes can be disposed above or below the other, and a vertical configuration is desirable. When the stirring vanes are disposed vertically, the stirring directions above and below are desirably opposite each other. The details of stirring and mixing are as set forth above. Since the reaction tank shown in FIG. 2 is a continuous-type reaction tank, the feeding of the starting materials is conducted in parallel, and solution is removed from within the reaction tank. In the continuous-type reaction tank 20 shown in FIG. 2, removal is conducted through removal outlet 24. The rate of removal is not specifically limited, and can be determined by taking into account a balance with the quantity of starting materials being fed (the feeding rate).

Other details of the embodiment employing a continuous-type reaction tank shown in FIG. 2 are as set forth for the embodiment employing a batch-type reaction tank shown in FIG. 1.

In the further embodiment set forth above, two feed passages can be converged to mix a solution containing the iron salt and divalent metal salt and a water-based solution containing base, and prepare precursor. This is a desirable embodiment in terms of inhibiting pH fluctuation in the reaction system during hexagonal ferrite precursor preparation. The details are given further below.

(Organic Compound and Preparation of Organic Compound Solution)

The organic compound can be added during precursor preparation in an embodiment set forth above. In addition, the organic compound can be employed in the reaction for converting the precursor to hexagonal ferrite. In an embodiment, the organic compound can be added to a solvent and mixed with the precursor solution as an organic compound solution, or can be introduced into a feed passage to which high-temperature, high-pressure water is being fed. In that case, the organic compound is desirably mixed in a quantity of about 1 to 1,000 weight parts per 100 weight parts of hexagonal ferrite precursor. Water or an organic solvent that is miscible with water or hydrophilic is desirable as the solvent. From this perspective, the use of an organic solvent in the form of a polar solvent is suitable. Examples of desirable organic solvents are those given by way of example of various solvents above. The concentration of the organic compound in the organic compound solution can be set so that the above desirable quantity of organic compound is mixed in or introduced. The organic compound can be added during preparation of the precursor and further added during the reaction converting the precursor to hexagonal ferrite. When employing organic compounds in two or more stages, the organic compounds employed in the various stages can be identical or different. Use of the polyalkyleneimine-polyester polymer set forth above in any one or more of the stages is desirable to increase the uniformity of the particle size of the isotropic particles satisfying relation 1 above (that is, reduce the coefficient of variation in the particle size). This point was also discovered by the present inventors.

(Preparation of Hexagonal Ferrite)

The reaction converting hexagonal ferrite precursor to hexagonal ferrite is desirably conducted by the following process:

simultaneously or sequentially introducing the hexagonal ferrite precursor and organic compound to a feed passage to which water is being continuously fed with heating and pressurizing;

converting the hexagonal ferrite precursor to hexagonal ferrite within a reaction flow passage by continuously feeding a water-based solution containing at least the hexagonal ferrite precursor, organic compound, and water to a reaction flow passage within which a fluid flowing therein is subjected to heating and pressurizing;

discharging the water-based solution containing the hexagonal ferrite from the reaction flow passage and feeding it to a cooling element; and recovering hexagonal ferrite from the water-based solution that has been cooled in the cooling element. Here, controlling the solution temperature at the point of first contact between the hexagonal ferrite precursor and organic compound in the above feed passage is an example of one means of obtaining hexagonal ferrite powder according to an aspect of the present invention set forth above.

The pH of the water-based solution following cooling is either identical to or correlates with the pH in the reaction system within the reaction flow passage. Controlling the pH of the water-based solution following cooling is another example of a means of obtaining the above hexagonal ferrite powder.

In this context, when, for example, a flow passage of a solution containing hexagonal ferrite precursor and an organic compound is converged with a feed passage to which high-temperature, high-pressure water is being fed, the "point of first contact" is the point where the flow passage and the feed passage converge.

Further, if the flow passage of the hexagonal ferrite precursor-containing solution is converged with the feed passage to which the high-temperature, high-pressure water is fed, after which a flow passage of solution containing the organic compound is converged with the feed passage at a point positioned to the downstream side thereof, the "point of first contact" will be the point of converging of the feed passage and the flow passage of the organic compound-containing solution. In this context, the term "to the downstream side" refers to the side nearer the reaction flow passage in the feeding direction within the feed passage. The "upstream side" referred to further below refers to the opposite.

Conversely, if the flow passage of the organic compound-containing solution is converged with the feed passage to which the high-temperature, high-pressure water is fed, and the flow passage of the hexagonal ferrite precursor-containing solution is subsequently converged with the feed passage at a point positioned downstream from this point of converging, the "point of first contact" will be the point of converging of the flow passage of the hexagonal ferrite precursor-containing solution with the feed passage.

The pH of the water-based solution following the above cooling refers to the pH of the water-based solution that has been discharged through the discharge outlet of the cooling element. It is a value that is obtained by recovering at least a portion of the water-based solution that has been discharged through the discharge outlet at some position, adjusting it to a solution temperature of 25° C., and measuring the pH.

An example of a means of controlling the pH of the water-based solution that has been discharged from the reaction flow passage and cooled by the cooling element is adding a base or an acid. Specifically, it is possible to use an acidic compound as an organic compound, to use an alkaline compound as an organic compound, to mix a base, an acid, or a base and an acid into the organic compound solution, and to determine the quantities that are added so as to keep the pH of the water-based solution that has been discharged from the reaction flow passage and cooled in the cooling element to within the desired range. The term "acidic" as relates to the organic compound refers to one or more acids as defined by Arrhenius, Bronsted, or Lewis (Arrhenius acid, Bronsted acid, or Lewis acid). The term "alkaline" as relates to the organic compound refers to one or more bases as defined by Arrhenius, Bronsted, or Lewis (Arrhenius base, Bronsted base, or Lewis base). The bases and acids are as set forth above.

—Mixing the Precursor Solution, Organic Compound Solution, and High-Temperature, High-Pressure Water—

As an example of one embodiment of mixing the precursor and organic compound, as set forth above, the precursor is prepared in the presence of an organic compound. The precursor solution thus obtained contains the precursor and an organic compound, with the organic compound desirably having been coated on the surface of the precursor. This embodiment will be referred to as Embodiment A below.

In an example of another embodiment, the precursor solution and the organic compound solution are sequentially introduced into a feed passage to which high-temperature, high-pressure water is being fed. This embodiment will be referred to as Embodiment B below.

In an example of still another embodiment, the precursor solution and the organic compound solution are mixed, after which the mixed solution that has been obtained is introduced into a feed passage to which high-temperature, high-pressure water is being fed. This embodiment will be referred to as Embodiment C below.

Embodiments B and C include embodiments in which preparation of the precursor is conducted in a continuous manufacturing process.

Embodiments A to C above will be described with reference to the drawings.

FIGS. 3 to 8 are schematic descriptive drawings of manufacturing devices that can be used to manufacture hexagonal ferrite powder by continuously conducting a hydrothermal synthesis process (continuous hydrothermal synthesis process).

Figure 3:
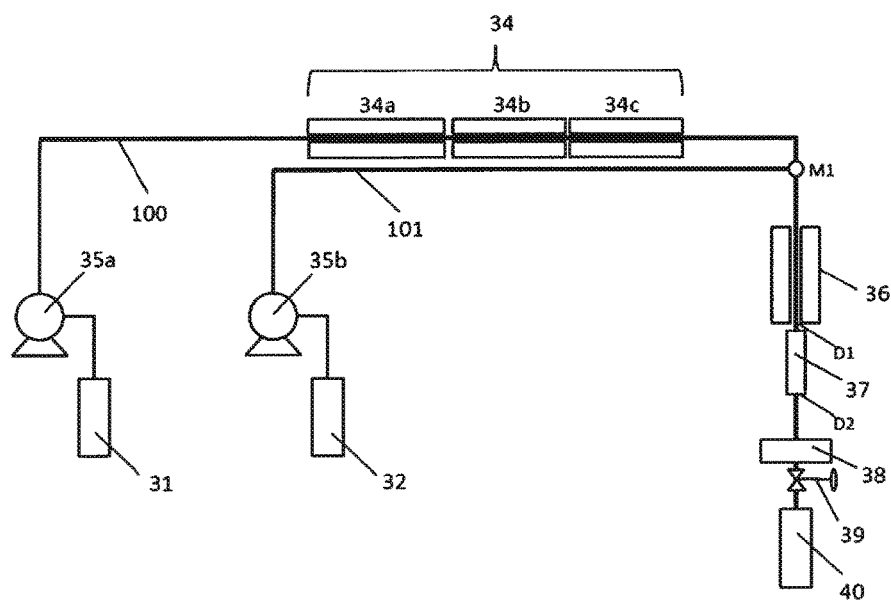
FIG. 3 is a schematic descriptive drawing of an example of a manufacturing device that can be used to prepare hexagonal ferrite by a continuous hydrothermal synthesis method.
Figure 4:
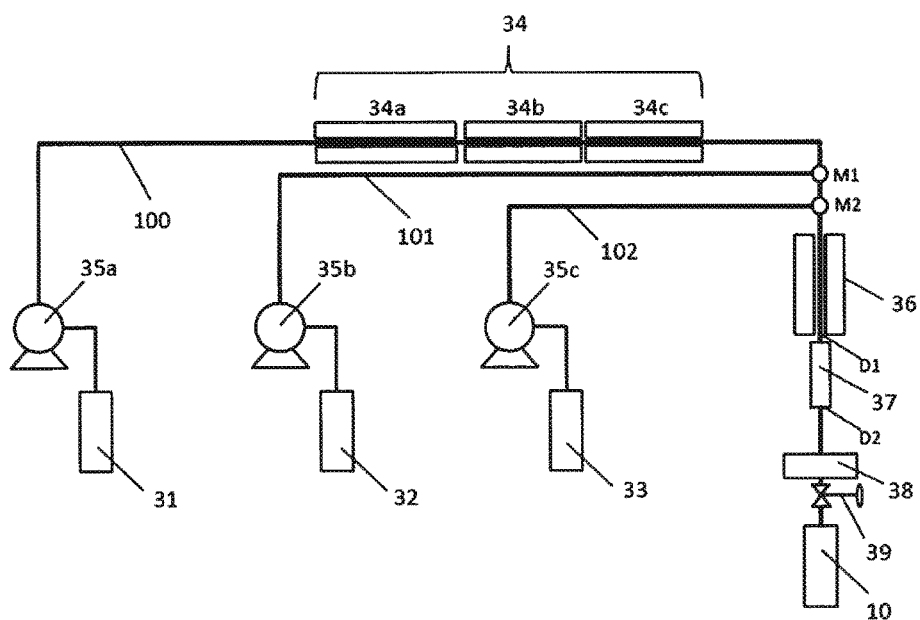
FIG. 4 is a schematic descriptive drawing of an example of a manufacturing device that can be used to prepare hexagonal ferrite by a continuous hydrothermal synthesis method.
Figure 5:
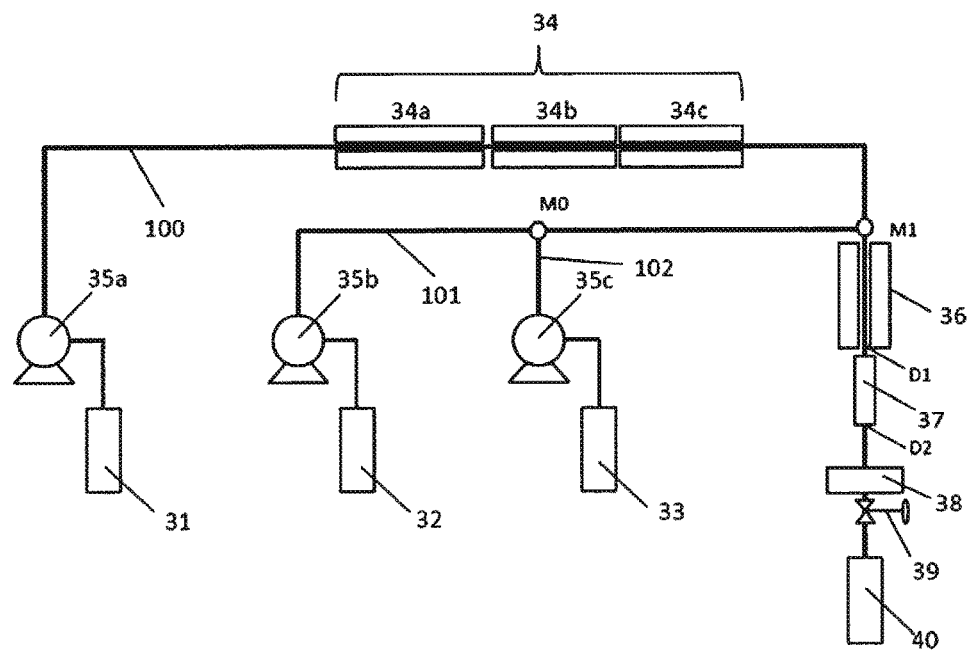
FIG. 5 is a schematic descriptive drawing of an example of a manufacturing device that can be used to prepare hexagonal ferrite by a continuous hydrothermal synthesis method.

More specifically, FIG. 3 is a schematic descriptive drawing of an example of a manufacturing device that is suited to Embodiment A. FIG. 4 is a schematic descriptive drawing of an example of a manufacturing device that is suited to Embodiment B. And FIG. 5 is a schematic descriptive drawing of an example of a manufacturing device that is suited to Embodiment C.

Figure 6:
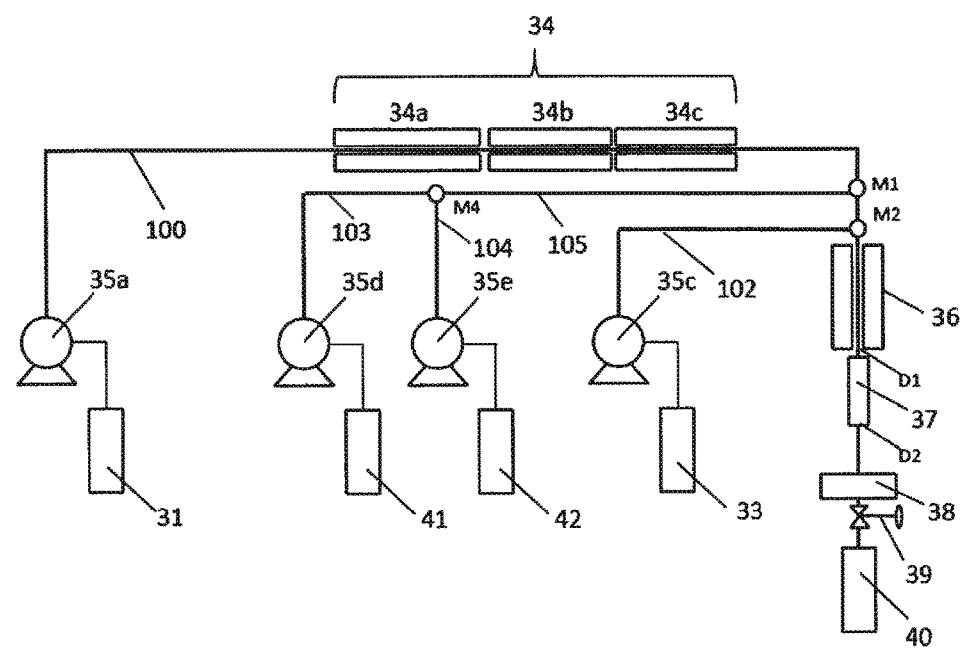
FIG. 6 is a schematic descriptive drawing of an example of a manufacturing device that can be used to prepare hexagonal ferrite by a continuous hydrothermal synthesis method.
Figure 7:
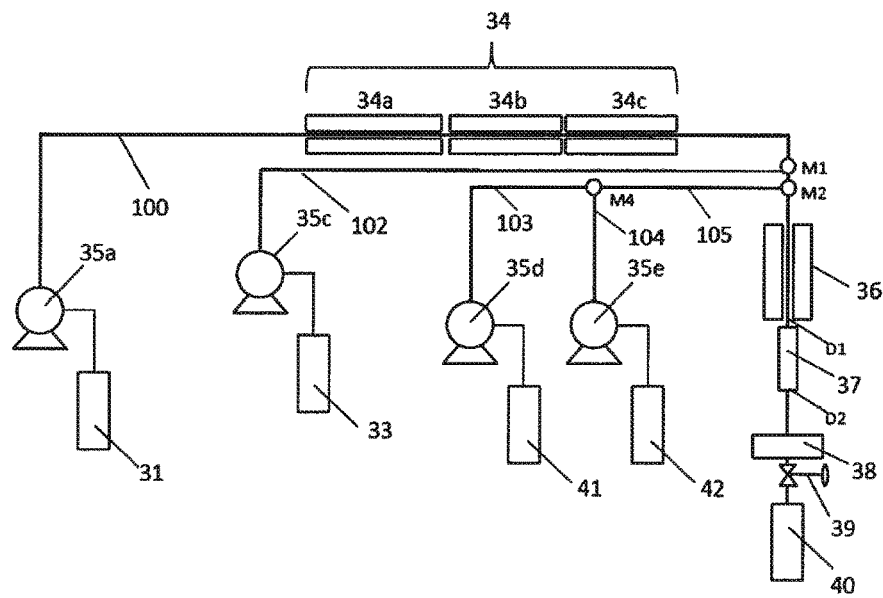
FIG. 7 is a schematic descriptive drawing of an example of a manufacturing device that can be used to prepare hexagonal ferrite by a continuous hydrothermal synthesis method.
Figure 8:
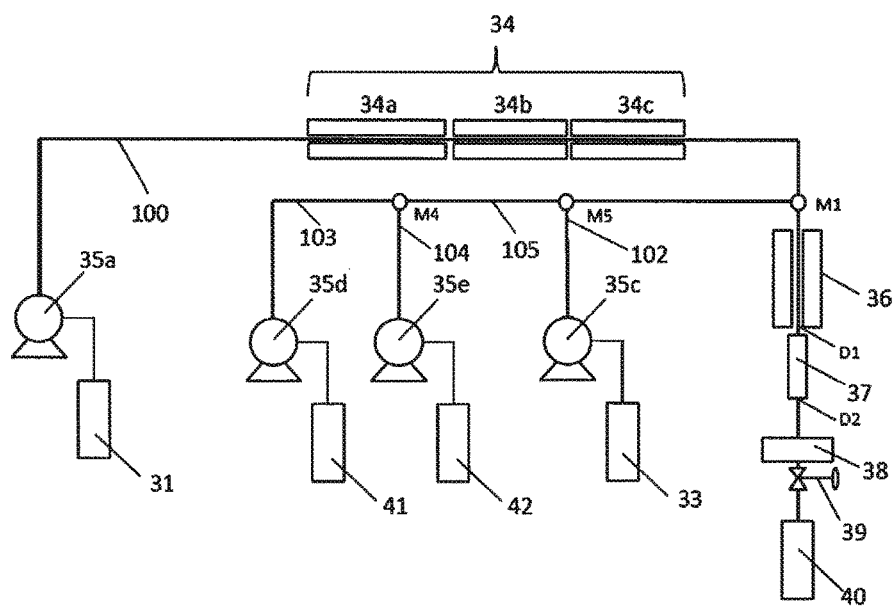
FIG. 8 is a schematic descriptive drawing of an example of a manufacturing device that can be used to prepare hexagonal ferrite by a continuous hydrothermal synthesis method.

FIGS. 6 and 7 are schematic descriptive drawings of an example of a manufacturing device that is suited to an embodiment of preparing the precursor (precursor solution) continuously in the manufacturing process in Embodiment B. FIG. 8 is a schematic descriptive drawing of an example of a manufacturing device that is suited to an embodiment of preparing the precursor (precursor solution) continuously in the manufacturing process in Embodiment C.

In FIGS. 3 to 8, identical constituent elements are denoted by identical symbols.

The example of FIG. 3 will be described. The manufacturing device shown in FIG. 3 comprises liquid tanks 31 and 32; heating means 34 (34a to 34c); pressurizing and feeding means 35a and 35b; a reaction flow passage 36; a cooling element 37; a filtering means 38; a pressure-regulating valve (back pressure valve) 39; and a recovery element 40. Fluids are fed from the various liquid tanks to feed passage 100 and flow passage 101. In the figure, there are three heating means. However, this is merely an example, and there is no limitation thereto.

The manufacturing device shown in FIGS. 4 and 5, in addition to the above configuration, also comprises a liquid tank 33, pressurizing and feeding means 35c, and flow passage 102.

The manufacturing device shown in FIGS. 6, 7, and 8, in addition to the above configuration, also comprises liquid tanks 41 and 42; pressurizing and feeding means 35d and 35e; and flow passages 103, 104, and 105.

In an embodiment, pure water, distilled water, or the like is introduced into liquid tank 31; hexagonal ferrite precursor solution (which contains an organic compound in Embodiment A) is introduced into liquid tank 32; and organic compound solution is introduced into liquid tank 33. The water that has been introduced into liquid tank 31 is fed to feed passage 100 while being pressurized by pressurizing and feeding means 35a, and is heated by heating means 34. This heating and pressurizing is done to place the water in a state of high temperature and high pressure, and desirably done to place the water in a subcritical to supercritical state. Because water in a subcritical to supercritical state can exhibit extremely high reactivity, contact with water in such a state instantaneously can place the hexagonal ferrite precursor in a highly reactive state, making it possible for the conversion to ferrite to progress early on. Water will generally assume a subcritical to supercritical state when heated to equal to or higher than 200° C. and pressurized to equal to or higher than 20 MPa. Accordingly, this heating and pressurizing of the water is desirably done to a temperature of equal to or higher than 200° C. and a pressure of equal to or higher than 20 MPa. The high-temperature, high-pressure water that has been heated and pressurized is fed into feed passage 100 and reaches mixing element M1.

In Embodiment A (FIG. 3), a precursor solution containing hexagonal ferrite precursor and an organic compound is fed to pipe 101 by pressurizing and feeding means 35b from liquid tank 32, and converges with feed passage 100 feeding high-temperature, high-pressure water in mixing element M1. Accordingly, in Embodiment A, the point of first contact where the hexagonal ferrite precursor and the organic compound first come into contact in the feed passage is mixing element M1.

In Embodiment B (FIG. 4), hexagonal ferrite precursor solution is fed from liquid tank 2 by pressurizing and feeding means 35b to flow passage 101, converging with feed passage 100 feeding high-temperature, high-pressure water in mixing element M1. Subsequently, the mixed flow of high-temperature, high-pressure water and hexagonal ferrite precursor solution converges in mixing member M2 with the organic compound solution fed from liquid tank 33 by pressurizing and feeding means 35c to flow passage 102. Accordingly, in Embodiment B, the point of first contact where the hexagonal ferrite precursor solution begins to mix with the organic compound in the feed passage is mixing element M2. In Embodiment B, in contrast to the above example, organic compound solution can be introduced to liquid tank 32 and hexagonal ferrite precursor solution can be introduced into liquid tank 33.

In Embodiment C (FIG. 5), hexagonal ferrite precursor solution is fed from liquid tank 32 by pressurizing and feeding means 35b to flow passage 101 and converges with the organic compound solution that is being fed to flow passage 102 by pressurizing and feeding means 5c from liquid tank 33 in mixing element M0. Subsequently, the mixed flow of hexagonal ferrite precursor solution and organic compound solution passes over flow passage 101 and converges with high-temperature, high-pressure water in mixing element M1. Accordingly, in Embodiment C, the point of first contact where the hexagonal ferrite precursor solution and the organic compound begin to mix in the feed passage is mixing element M1. In Embodiment C, as well, in contrast to the above example, the organic compound solution can be introduced into liquid tank 32 and the hexagonal ferrite precursor solution can be introduced into liquid tank 33.

The manufacturing device shown in FIGS. 6 and 7 is a manufacturing device suited to an embodiment in which hexagonal ferrite precursor solution is continuously prepared in the manufacturing process in Embodiment B. In the manufacturing device shown in FIGS. 6 and 7, a solution containing an iron salt and a divalent metal salt (referred to as the "starting material solution" below) is introduced into liquid tank 41 and a base-containing water-based solution (normally not containing an iron salt or a divalent metal salt) is introduced into liquid tank 42. The starting material solution that is fed to pipe 103 by pressurizing and feeding means 35d from liquid tank 41 and the base-containing water-based solution that is fed to pipe 104 by pressurizing and feeding means 35e from liquid tank 42 converge in mixing element M4. In contrast to the above example, it is also possible for the base-containing water-based solution to be introduced into liquid tank 41 and the starting material solution to be introduced into liquid tank 42.

In the manufacturing device shown in FIG. 6, the mixed flow thus obtained passes over flow passage 105 and converges in mixing element M1 with high-temperature, high-pressure water that has been fed to flow passage 100 by pressurizing and feeding means 35a from liquid tank 31 and heated by heating means 34. The mixed flow thus obtained then converges in mixing element M2 with the organic compound solution that has been fed to flow passage 102 by pressurizing and feeding means 35c from liquid tank 33.

In the manufacturing device shown in FIG. 7, the mixed solution obtained as set forth above passes over flow passage 105 and converges in mixing element M2 with a mixed flow that has been obtained by converging in mixing element M1 the high-temperature, high-pressure water that has been fed to flow passage 100 by pressurizing and feeding means 35a from liquid tank 31 and heated by heating means 34 with the organic compound solution that has been fed to flow passage 102 by pressurizing and feeding means 35c from liquid tank 33.

In the manufacturing device shown in FIGS. 6 and 7, the point of first contact where mixing of the hexagonal ferrite precursor solution and the organic compound begins in the above feed passage is mixing element M2.

The details of subsequent processing in the manufacturing device of FIGS. 6 and 7 are as set forth in the description of the manufacturing device shown in FIG. 4 above.

The manufacturing device shown in FIG. 8 is a manufacturing device that is suited to an embodiment in which the hexagonal ferrite precursor is prepared in a continuous manufacturing process in Embodiment C. In the manufacturing device shown in FIG. 8, a solution (starting material solution) containing an iron salt and a divalent metal salt is introduced to a liquid tank 41 and a base-containing water-based solution (normally not containing an iron salt or a divalent metal salt) is introduced into a liquid tank 42. The starting material solution that is fed to pipe 103 by pressurizing and feeding means 35d from liquid tank 41 is converged in mixing element M4 with the base-containing water-based solution that is fed to pipe 104 by pressurizing and feeding means 35e from liquid tank 42. In contrast to the above example, the base-containing aqueous solution can be introduced to liquid tank 41 and the starting material solution can be introduced to liquid tank 42.

The mixed flow thus obtained is converged in mixing element M5 of flow passage 105 with the organic compound solution fed to pipe 102 by pressurizing and feeding means 35c from liquid tank 33. The mixed solution thus obtained is converged in mixing member M1 with high-temperature, high-pressure water that is fed to flow passage 100 by pressurizing and feeding means 35a from liquid tank 31 and heated by heating means 34. In the manufacturing device shown in FIG. 8, the point of first contact where the hexagonal ferrite precursor solution beings to mix with the organic compound in the feed passage is mixing element M1.

The details of the subsequent process are as set forth in the description of the manufacturing device shown in FIG. 5 above.

The present inventors presume that controlling the solution temperature at the point of first contact can contribute to obtaining hexagonal ferrite powder containing a large quantity of isotropic particles satisfying relation 1 as well as having the above-stated average particle size. The lower the temperature at the point of first contact, the milder the reaction converting the hexagonal ferrite precursor to hexagonal ferrite progresses in the presence of an organic compound. As a result, it is thought that the particle size may increase, and that the particle size may end up being varied. From this perspective, the temperature at the point of first contact is desirably equal to or higher than 200° C., preferably equal to or higher than 230° C., and more preferably, equal to or higher than 250° C. The present inventor presumes that when the temperature at the point of first contact is excessively high, the reaction progresses too fast, decreasing the isotropy of the particle shape of the hexagonal ferrite powder obtained. From these perspectives, the temperature at the point of first contact is desirably equal to or lower than 400° C., preferably equal to or lower than 380° C., and more preferably, equal to or lower than 350° C. In an embodiment, it is still more preferably less than 300° C., and yet still more preferably, equal to or lower than 290° C.

The temperature at the point of first contact can be controlled by, for example, controlling the temperature of the solution that is fed to the point of first contact. To that end, for example, it is possible to provide at any position within the device a known temperature control means for heating and cooling the solutions that are fed to flow passages 101, 102, 103, 104, and 105. In Embodiment C, in which the flow passage of hexagonal ferrite precursor solution and the flow passage of organic compound solution are converged, the mixed liquid obtained is introduced to a feed passage to which high-temperature, high-pressure water is flowing. From the perspective of obtaining hexagonal ferrite powder with little variation in particle size, the mixed liquid is desirably not heated following converging of the flow passage of hexagonal ferrite precursor solution and the flow passage of the organic compound solution. Accordingly, in the above embodiments, if the hexagonal ferrite precursor solution is heated, the heating is desirably conducted prior to converging the organic compound solution. For example, in one desirable embodiment, a heating means can be provided to the upstream side of mixing element M0 of flow passage 101 in the manufacturing device shown in FIG. 1. In that case, a cooling means can also be provided to the downstream side of mixing element M0. It then suffices to conduct the heating and cooling of individual solutions in a manner so as to achieve the desired solution temperature at the point of first contact.

The temperature at the point of first contact can also be controlled by adjusting one or more from among the temperature and flow rate of the high-temperature, high-pressure water; the flow rate of the hexagonal ferrite precursor solution; the flow rate of the organic compound solution; and the flow rate of the mixed flow obtained by combining the hexagonal ferrite precursor solution and the organic compound solution. It suffices to effect this adjustment so that the solution temperature at the point of first contact is kept to the desired temperature. As an example, the solution temperature of the solutions and mixed flow normally differs from (is normally lower than) the temperature of the high-temperature, high-pressure water that is fed to the feed passage. Thus, it is possible to control the temperature at the point of first contact by varying the ratio of the flow rate of the mixed flow, the solutions that are introduced to the feed passage, and the flow rate of the high-temperature, high-pressure water.

Following mixing in the above mixing elements, the mixed flow of high-temperature, high-pressure water, hexagonal ferrite precursor, and organic compound (the water-based solution containing hexagonal ferrite precursor, organic compound, and water) is fed through feed passage 100 to the reaction flow passage 6. In reaction flow passage 36, the mixed flow is heated as well as being pressurized by pressurizing means 35a to place the water contained in the mixed flow in reaction flow passage 36 in a state of high temperature and high pressure, desirably in a subcritical to supercritical state, so that conversion of the hexagonal ferrite precursor to ferrite can advance. Subsequently, solution in which hexagonal ferrite precursor has been converted to ferrite and thus containing particles of hexagonal ferrite is discharged through discharge outlet D1. The discharged solution is fed to cooling element 37 and cooled in cooling element 37. Subsequently, the hexagonal ferrite particles are captured by a filtering means (filter or the like) 38. The hexagonal ferrite particles that have been captured by filtering means 38 are released by filtering means 38, pass through pressure-regulating valve 39, and are recovered in recovery element 40.

Regarding the heating and pressurizing reaction flow passage 36, the reaction system in which water is present is heated to equal to or higher than 300° C. and pressurized to a pressure of equal to or higher than 20 MPa to put the water in a subcritical to supercritical state, creating a reaction field of extremely high reactivity. Placing the hexagonal ferrite precursor in this state can cause ferrite conversion to advance rapidly, yielding hexagonal ferrite magnetic particles. Accordingly, the heating temperature is desirably a temperature at which the mixed flow in the reaction flow passage reaches equal to or higher than 300° C. The heating temperature is preferably set so that the temperature of the water-based solution that is discharged from the reaction flow passage and fed to the cooling element reaches equal to or higher than 350° C. but equal to or lower than 450° C. Here, the solution temperature refers to the solution temperature at the discharge outlet of the reaction flow passage (discharge outlet D1 in the devices shown in FIGS. 3 to 8). Conducting the reaction that converts the hexagonal ferrite precursor in the reaction flow passage into hexagonal ferrite under temperature conditions such that the solution temperature at the discharge outlet of the reaction flow passage falls within the above-stated range is desirable from the perspective of enhancing the magnetic characteristics of the hexagonal ferrite powder obtained. This has been presumed by the present inventor to occur because of improved crystallinity of the hexagonal ferrite powder. The solution temperature is preferably equal to or higher than 360° C. but equal to or lower than 430° C., more preferably equal to or higher than 380° C. but equal to or lower than 420° C. The pressure that is applied to the mixed flow in the reaction flow passage is desirably equal to or higher than 20 MPa, preferably falling within a range of 20 to 50 MPa.

As set forth above, the water-based solution that has been discharged from the reaction flow passage is cooled in the cooling element. This cooling in the cooling element can completely halt the reaction that converts hexagonal ferrite precursor into hexagonal ferrite. This is desirable to obtain hexagonal ferrite powder with little variation in particle size. For this reason, the cooling in the cooling element is desirably conducted to a temperature of the water-based solution within the cooling element of equal to or lower than 100° C., and preferably conducted to equal to or higher than room temperature (about 20 to 25° C.) but equal to or lower than 100° C. The cooling can be conducted using a known cooling means such as a water-cooling device the interior of which is cooled by circulating cold water. The same pressure as that applied in the feed passage and reaction flow passage is normally applied to the water-based solution in the cooling element.

The pH of the water-based solution following cooling in the cooling element is desirably equal to or higher than 6.00 but equal to or lower than 12.00. The "pH . . . following cooling" referred to here is the pH of the water-based solution that has been discharged through the discharge outlet (discharge outlet D2 in FIGS. 3 to 8) of the cooling element, as set forth above. This pH can be measured by collecting a portion of the water-based solution recovered in recovery element 40 after passing through pressure-regulating valve 39, and adjusting the solution temperature to 25° C. The components that cause the pH of the water-based solution to change in the cooling element are normally not added. Accordingly, the pH of the water-based solution following cooling is either the same as the pH of the reaction system in the reaction flow passage in which the reaction that converts the hexagonal ferrite precursor to hexagonal ferrite is conducted, or correlates with it. The above-described means of controlling the pH can be used to control the pH of the water-based solution following cooling. From the perspective of ease of controlling the particle shape of the hexagonal ferrite, the pH is desirably equal to or lower than 11.50, preferably equal to or lower than 11.00. To further decrease the particle size of the hexagonal ferrite and further decrease variation in the particle size, the pH is desirably equal to or higher than 6.50.

In the manufacturing method set forth above, it is desirable to employ high pressure-use metal piping as the feed passages and flow passages (also referred to as "piping" hereinafter) to apply pressure to the fluids that are fed through the interior. The metal constituting the piping is desirably SUS316, SUS 304, or some other stainless steel, or a nickel-based alloy such as Inconel (Japanese registered trademark) or Hastelloy (Japanese registered trademark) because of their low-corrosion properties. However, there is no limitation thereto. Equivalent or similar materials can also be employed. The piping of laminate structure described in Japanese Unexamined Patent Publication (KOKAI) No. 2010-104928, which is expressly incorporated herein by reference in its entirety, can also be employed.

In the manufacturing devices shown in FIGS. 3 to 8, the various mixing elements have structures such that pipes are joined by T-joints. The reactors described in Japanese Unexamined Patent Publication (KOKAI) Nos. 2007-268503, 2008-12453, 2010-75914, and the like, which are expressly incorporated herein by reference in their entirety, can be employed as the mixing elements. The material of the reactor is desirably the material described in Japanese Unexamined Patent Publication (KOKAI) No. 2007-268503, 2008-12453, or 2010-75914, which are expressly incorporated herein by reference in their entirety. Specifically, the metals set forth above as being suitable for constituting piping are desirable. However, there is no limitation thereto, and equivalent or similar materials can be employed. Combination with low-corrosion titanium alloys, tantalum alloy, ceramics and the like is also possible.

A number of specific embodiments of methods of manufacturing the above hexagonal ferrite powder have been set forth above. However, the above hexagonal ferrite powder is not limited to being manufactured by the manufacturing methods of these specific embodiments.

The magnetic layer containing the hexagonal ferrite powder described above will be described next.

<Magnetic Layer>
<<Squareness in the Vertical Direction>>

In the magnetic recording medium according to an aspect of the present invention, the above hexagonal ferrite powder is incorporated as ferromagnetic powder into the magnetic layer and the squareness in the vertical direction of the magnetic layer is greater than or equal to 0.65 but less than or equal to 1.00. From the perspective of enhancing the electromagnetic characteristics, the squareness in the vertical direction of the magnetic layer is desirably greater than or equal to 0.67, preferably greater than or equal to 0.70. The squareness in the vertical direction of the magnetic layer can be, for example, less than or equal to 0.90, less than or equal to 0.85, or less than or equal to 0.80. However, since the higher it is the better from the perspective of enhancing the electromagnetic characteristics, there is no limitation to these levels. The squareness in the vertical direction theoretically has a maximum value of 1.00. It is possible to form a magnetic layer containing the above hexagonal ferrite powder and exhibiting a squareness in the vertical direction of greater than or equal to 0.65 but less than or equal to 1.00 by increasing the vertical orientation property of the above hexagonal ferrite powder.

<<Magnetic Layer Components>>
(Ferromagnetic Powder)

Details regarding the ferromagnetic powder contained in the magnetic layer are as set forth above. The content (fill rate) of the ferromagnetic powder in the magnetic layer desirably falls within a range of 50 to 90 weight %, preferably within a range of 60 to 90 weight %. The higher the fill rate the better from the perspective of increasing the recording density.

(Binder)

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed in any content with the above resin.

(Additives)

Additives can be added to the magnetic layer as needed. Examples of additives are abrasives, lubricants, dispersing agents, dispersion adjuvants, fungicides, antistatic agents, oxygen inhibitors, and carbon black. The additives described above can be suitably selected for use from among commercial products based on the properties that are desired.

An example of an additive that is desirable as a magnetic layer component is the above-described polyalkyleneimine-polyester polymer. When employed as an additive in the magnetic layer, the quantity added is desirably greater than or equal to 0.5 weight part, preferably greater than or equal to 1.0 weight part, per 100.0 weight parts of ferromagnetic powder. From the perspectives of achieving higher density recording and of increasing the fill rate of ferromagnetic powder in the magnetic layer, the quantity of polyalkyleneimine-polyester polymer added is desirably less than or equal to 50.0 weight parts, preferably less than or equal to 40.0 weight parts, more preferably less than or equal to 30.0 weight parts, still more preferably less than or equal to 20.0 weight parts, and yet more preferably, less than or equal to 10.0 weight parts, per 100.0 weight parts of ferromagnetic powder.

<Nonmagnetic Layer>

The nonmagnetic layer will be described next. The magnetic recording medium according to an aspect of the present invention can have a magnetic layer directly on a nonmagnetic support, or can have a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to paragraphs 0036 to 0039 of Japanese Unexamined Patent Publication (KOKAI) No. 2010-24113.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to paragraphs 0040 to 0042 of Japanese Unexamined Patent Publication (KOKAI) No. 2010-24113.

<Nonmagnetic Support>

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable. These supports can be subjected in advance to corona discharge, plasma treatment, adhesion-enhancing treatment, heat treatment, or the like.

<Thickness of the Nonmagnetic Support and Thickness of the Various Layers>

In the magnetic recording medium according to an aspect of the present invention, the thickness of the nonmagnetic support is desirably 3.0 to 80.0 μm. The thickness of the magnetic layer can be optimized based on the saturation magnetization level of the magnetic head employed, the head gap length, and the bandwidth of the recording signal. Generally, it is from 10 nm to 150 nm. From the perspective of achieving a higher recording density, it is desirably 20 nm to 120 nm, preferably 30 nm to 100 nm. It suffices for a single magnetic layer to be present, and the magnetic layer can be separated into two or more layers with different magnetic characteristics. Known multilayer magnetic layer configurations can be applied.

The thickness of the nonmagnetic layer is, for example, 10 nm to 3.0 μm, desirably 50 nm to 2.0 μm, and preferably, 50 nm to 1.5 μm. The nonmagnetic layer in the present invention includes, for example, substantially nonmagnetic layers containing small quantities of ferromagnetic powder, either as impurities or intentionally, in addition to nonmagnetic powder. The term "substantially nonmagnetic layer" refers to a layer in which the residual magnetic flux density is less than or equal to 10 mT, or the coercive force is less than or equal to 7.96 kA/m (100 Oe), or the residual magnetic flux density is less than or equal to 10 mT and the coercive force is less than or equal to 7.96 kA/m (100 Oe). The nonmagnetic layer desirably has no residual magnetic flux density or coercive force.

<Backcoat Layer>

The above magnetic recording medium can have a backcoat layer on the opposite surface of the nonmagnetic support from the surface on which the magnetic layer is present. The backcoat layer is a layer that contains nonmagnetic powder and binder. The nonmagnetic powder is in the form of at least carbon black or an inorganic powder, and desirably contains both. The formulas of the magnetic layer and nonmagnetic layer can be applied to the binders and various additives for forming the backcoat layer. The thickness of the backcoat layer is desirably less than or equal to 0.9 μm and preferably 0.1 μm to 0.7 μm.

The thickness of the various layers in the magnetic recording medium and the nonmagnetic support can be determined by known film thickness measuring methods. For example, a cross-section in the direction of thickness of the magnetic recording medium is exposed by a known technique such as with an ion beam or microtome, and the exposed cross-section is observed with a scanning electron microscope. The thickness determined at one spot in the direction of thickness by observing the cross-section can be adopted, or the thickness at two or more spots that have been randomly exposed—for example, two spots—can be determined and the arithmetic average thereof adopted. The thickness of each of the various layers can also be determined as a design thickness calculated from manufacturing conditions.

<Manufacturing Method>

The composition for forming the magnetic layer, nonmagnetic layer or backcoat layer normally contains solvent in addition to the various components set forth above. Examples of solvents are the various organic solvents commonly employed in the manufacturing of particulate magnetic recording media. The process of preparing the compositions for forming the various layers normally contains at least a kneading step, dispersion step, and mixing steps that are provided as needed before and after these other steps. Each of these steps can be divided into two or more stages. All of the starting materials employed in the present invention, such as ferromagnetic powder, binder, nonmagnetic powder, various optionally added additives, and solvent, can be added at the outset, or in the course of, any step. Individual starting materials can be divided and added during two or more steps. A powerful kneading device, such as an open kneader, continuous kneader, pressurized kneader, or extruder is desirably employed in the kneading step. Details of these kneading processes are given in Japanese Unexamined Patent Publication (KOKAI) Nos. Heisei 1-106338 and 1-79274, which are expressly incorporated herein by reference in their entirety. Glass beads and other types of beads can be employed to disperse the various layer-forming compositions. High specific gravity dispersion beads in the form of zirconia beads, titania beads, and steel beads are suitable as such dispersion beads. These dispersion beads can be employed by optimizing their diameters (bead diameter) and fill rates. A known dispersion apparatus can be employed.

The magnetic layer can be formed by directly coating a magnetic layer-forming composition on a nonmagnetic support, or by sequentially or simultaneously multilayer coating it with a nonmagnetic layer-forming composition. The backcoat layer can be formed by coating a backcoat layer-forming composition on the opposite side of the nonmagnetic support from the side on which the magnetic layer has been formed (or will be formed). Reference can be made to paragraph 0051 of Japanese Unexamined Patent Publication (KOKAI) No. 2010-24113, for details regarding coatings to form various layers. A finished product magnetic recording medium can be obtained by the steps of coating and drying various layer-forming compositions, a step of orienting the magnetic layer (magnetic field orientation processing), and various treatment steps (such as a calendering treatment step) conducted as needed.

The orientation step of the magnetic layer is normally conducted after coating the magnetic layer-forming composition, either directly or sequentially or simultaneously with a nonmagnetic layer-forming composition, on a nonmagnetic support to form a coating layer. This coating layer is introduced into a magnet zone while still in a wet state, and a magnetic field is applied. The orientation step of the magnetic layer is desirably conducted by means of a vertical orientation step of applying a magnetic field in a direction perpendicular to the surface of the coating layer. The processing conditions in the orientation step, such as the strength of the magnets employed to apply the magnetic field, are not specifically limited, and can be identical to the conditions of an ordinary magnetic field orientation treatment. In a magnetic layer containing greater than or equal to 80%, based on number of particles, of the isotropic particles satisfying relation 1 above and hexagonal ferrite powder having an average particle size of less than or equal to 30 nm, it has conventionally been difficult to achieve a squareness in the vertical direction of greater than or equal to 0.65 but less than or equal to 1.00. However, for example, it is possible to achieve a squareness in the vertical direction of greater than or equal to 0.65 but less than or equal to 1.00 by the means set forth above.

Reference can be made, for example, to paragraphs 0051 to 0057 of Japanese Unexamined Patent Publication (KOKAI) NO. 2010-24113, for details about methods of manufacturing magnetic recording media.

[Magnetic Signal Reproduction Device]

An aspect of the present invention relates to a magnetic signal reproduction device containing the above magnetic recording medium and a magnetic head.

As long as the magnetic signal reproduction device contains a magnetic recording medium according to an aspect of the present invention as a magnetic recording medium, known techniques can be applied without any limitation for the rest.

In one desirable embodiment, a magnetic signal that has been recorded at a linear recording density of greater than or equal to 200 kfci on the magnetic recording medium in the above magnetic signal reproduction device can be reproduced with a magnetic reproduction head. The magnetic recording medium according to an aspect of the present invention can be suitably employed to record and reproduce magnetic signals at high linear recording densities of greater than or equal to 200 kfci. The linear recording density is, for example, less than or equal to 400 kfci, but can exceed 400 kfci.

Reference can be made to paragraphs 0072 and 0073 of Japanese Unexamined Patent Publication (KOKAI) No. 2010-231843, which is expressly incorporated herein by reference in its entirety, for details regarding the configuration and the like of the above magnetic signal recording device.

EXAMPLES

The present invention will be described in greater detail below through Examples. However, the present invention is not limited to the embodiments given in Examples. The "parts" given below are "weight parts" unless specifically stated otherwise. The steps and evaluation given below were conducted in the atmosphere at 23° C.±1° C. unless specifically stated otherwise.

[Synthesis of Hexagonal Ferrite and/or Polyalkyleneimine-Polyester Polymer Employed in the Magnetic Layer-Forming Composition]

The polyalkyleneimine-polyester polymers J-1 to J-23 listed below are polyalkyleneimine-polyester polymers (polyalkyleneimine derivatives J-1 to J-23 in Japanese Unexamined Patent Publication (KOKAI) No. 2015-28830) that were prepared according to Synthesis Examples 21 to 43 in Japanese Unexamined Patent Publication (KOKAI) No. 2015-28830.

As regards the above polyalkyleneimine-polyester polymers, the polyalkyleneimine chain ratios, the number average molecular weight of the polyalkyleneimine chain (number average molecular weight of the polyalkyleneimine employed in synthesis), and the weight average molecular weights of the various polymers were obtained in accordance with paragraphs 0098 to 0100 of Japanese Unexamined Patent Publication (KOKAI) No. 2015-28830, and are given in the following table. These values are identical to those of polyalkyleneimine derivatives corresponding to the description in Japanese Unexamined Patent Publication (KOKAI) No. 2015-28830.

TABLE 1

| Polyalkylene-imine-polyester polymer | Polyalkylene-imine chain (polyethylene-imine chain) ratio (weight %) | Number average molecular weight of polyalkylene-imine chain | Weight average molecular weight |
|---|---|---|---|
| (J-1) | 4.8 | 1,800 | 15,000 |
| (J-2) | 2.3 | 600 | 7,000 |
| (J-3) | 4.3 | 1,200 | 22,000 |
| (J-4) | 4.8 | 600 | 34,000 |
| (J-5) | 4.8 | 300 | 19,000 |
| (J-6) | 1.2 | 1,800 | 8,000 |
| (J-7) | 2.9 | 1,800 | 13,000 |
| (J-8) | 2.4 | 1,200 | 18,000 |
| (J-9) | 4.8 | 600 | 22,000 |
| (J-10) | 3.8 | 300 | 24,000 |
| (J-11) | 0.3 | 1,200 | 28,000 |
| (J-12) | 1.0 | 1,800 | 15,000 |
| (J-13) | 4.8 | 1,200 | 4,000 |
| (J-14) | 2.3 | 600 | 6,000 |
| (J-15) | 2.3 | 600 | 6,300 |
| (J-16) | 2.3 | 600 | 5,900 |
| (J-17) | 2.3 | 600 | 5,300 |
| (J-18) | 2.4 | 600 | 7,300 |
| (J-19) | 2.4 | 600 | 9,800 |
| (J-20) | 2.4 | 600 | 9,300 |
| (J-21) | 2.4 | 600 | 8,900 |
| (J-22) | 2.4 | 600 | 15,100 |
| (J-23) | 2.4 | 600 | 7,580 |

Preparation Example 1: Hexagonal Ferrite Powder (1) Preparation of Starting Material Solution Barium salt in the form of barium hydroxide $(Ba(OH)_2 \cdot 8H_2O)$ and iron salt in the form of iron(III) nitrate $(Fe(NO_3)_3 \cdot 9H_2O)$ were dissolved in purified water to prepare an aqueous solution (starting material solution) containing the barium salt and iron salt. The combined concentration of the barium salt and iron salt in the starting material solution that was prepared was 0.075 mol/L and the Ba/Fe molar ratio was 0.5.

A potassium hydroxide aqueous solution (concentration 0.20 mol/L) was prepared by adding and dissolving potassium hydroxide in water.

(2) Preparation of Organic Compound Solution

Oleic acid was dissolved in ethanol to prepare an organic compound solution (concentration 0.75 mol/L).

(3) Synthesis Reaction of Hexagonal Ferrite

The starting material solution prepared in (1) above was introduced into liquid tank 41, the potassium hydroxide aqueous solution prepared in (1) above was introduced into liquid tank 42, and the organic compound solution (concentration 0.75 mol/L) prepared in (2) above was introduced into liquid tank 33 in the manufacturing device shown in FIG. 6. SUS316 BA tubing was employed as the piping of the manufacturing device.

High-temperature, high-pressure water was caused to flow through pipe 100 by heating with heater 34 and feeding with high-pressure pump 35a the purified water that had been introduced into liquid tank 31. In this process, the temperature and pressure were controlled so that the temperature of the high-temperature, high-pressure water after passing through heating means 34c was 350° C. and the pressure was 30 MPa.

The starting material solution and the potassium hydroxide aqueous solution were fed to pipe 103 or 104 at a liquid temperature of 25° C. with a pressurizing and feeding means (high-pressure pump 35d or 35e) so that the ratio based on volume of starting material solution:potassium hydroxide aqueous solution=50:50, to mix them at mixing element M4, then fed to pipe 105 and mixed with the high-temperature, high-pressure water at mixing element M1. The organic compound solution was fed to pipe 102 at a liquid temperature of 25° C. with a pressurizing and feeding means (high-pressure pump 35c) so that the ratio based on volume of (starting material solution+potassium hydroxide aqueous solution):organic compound solution=40:60, and mixed with the high-temperature, high-pressure water in mixing element M2. Next, it was heated and pressurized in reaction flow passage 36 to synthesize (convert the precursor to) hexagonal ferrite.

The mixed flow in reaction flow passage 36 was pressurized to 30 MPa and the liquid temperature was increased to greater than or equal to 300° C. so that the temperature of the liquid (measured by thermocouple) at discharge outlet D1 of reaction flow passage 36 was 390° C.

Subsequently, the liquid containing the hexagonal ferrite particles was discharged from reaction flow passage 36, cooled to less than or equal to 100° C. in cooling element 37 equipped with a water-cooling mechanism, and recovered by recovery element 40 after passing through pressure-regulating valve 39. A portion of the liquid that had been recovered was collected and adjusted to a liquid temperature of 25° C. Measurement with a pH meter (portable pH meter D series, made by Horiba) revealed a pH of 9.30. Hexagonal ferrite particles were collected from the remainder of the liquid that had been recovered from the recovery element. The collected particles were washed with ethanol then centrifuged to separate the powder.

Hexagonal ferrite powder 1 was thus obtained.

Preparation Example 2: Hexagonal Ferrite Powder

Instead of oleic acid in the preparation of the organic compound solution of (2) above, polyalkyleneimine-polyester polymer J-2 was dissolved in ethanol to prepare an organic compound solution (concentration 0.075 mol/L).

With the exception that the organic compound solution prepared above was employed, hexagonal ferrite powder 2 was obtained by the same method as in Preparation Example 1.

Preparation Example 3: Hexagonal Ferrite Powder

Instead of oleic acid in the preparation of the organic compound solution of (2) above, polyalkyleneimine-polyester polymer J-3 was dissolved in ethanol to prepare an organic compound solution (concentration 0.075 mol/L).

With the exception that the organic compound solution prepared above was employed, hexagonal ferrite powder 3 was obtained by the same method as in Preparation Example 1.

Preparation Example 4: Hexagonal Ferrite Powder

Instead of oleic acid in the preparation of the organic compound solution of (2) above, polyalkyleneimine-polyester polymer J-6 was dissolved in ethanol to prepare an organic compound solution (concentration 0.075 mol/L).

With the exception that the organic compound solution prepared above was employed, hexagonal ferrite powder 4 was obtained by the same method as in Preparation Example 1.

Preparation Example 5: Hexagonal Ferrite Powder

Instead of oleic acid in the preparation of the organic compound solution of (2) above, polyalkyleneimine-polyester polymer J-7 was dissolved in ethanol to prepare an organic compound solution (concentration 0.075 mol/L).

With the exception that the organic compound solution prepared above was employed, hexagonal ferrite powder 5 was obtained by the same method as in Preparation Example 1.

Preparation Example 6: Hexagonal Ferrite Powder

Instead of oleic acid in the preparation of the organic compound solution of (2) above, polyalkyleneimine-polyester polymer J-11 was dissolved in ethanol to prepare an organic compound solution (concentration 0.075 mol/L).

With the exception that the organic compound solution prepared above was employed, hexagonal ferrite powder 6 was obtained by the same method as in Preparation Example 1.

(1) Identification by X-Ray Diffraction Analysis

X-ray diffraction analysis of the powders obtained in the above Preparation Examples confirmed them to be hexagonal ferrite (barium ferrite).

(2) Average Particle Size of Hexagonal Ferrite Powder, Average Particle Size of Isotropic Particles Satisfying Relation 1, and Coefficient of Variation in Particle Size The average particle size (average major axis length) of the hexagonal ferrite obtained in the above Preparation Examples, the average particle size (average major axis length) of all of the particles determined to be isotropic particles satisfying relation 1 in (3) below, and the coefficient of variation in particle size (major axis length) were determined by the methods set forth above with a model H-9000 transmission electron microscope made by Hitachi.

(3) Observation of Particle Form

The form of 500 particles randomly extracted from powder obtained in the above Preparation Examples was observed by the method set forth above and the ratio accounted for by isotropic particles satisfying relation 1 above among all particles was calculated.

(4) Measurement of Saturation Magnetization and Coercive Force

The saturation magnetization and coercive force of the hexagonal ferrite particles obtained in the above Preparation Examples were measured at a magnetic field intensity of 1194 kA/m (15 kOe) with a vibrating sample magnetometer (made by Toei Industry Co., Ltd.).

The results are given in Table 2 below.

TABLE 2

| | Organic compound employed during preparation of hexagonal ferrite powder | Average major axis length of hexagonal ferrite powder | Ratio of particles satisfying relation 1 | Average major axis length of particles satisfying relation 1 | Coefficient of variation in average major axis length of particles satisfying relation 1 | Saturation magnetization of hexagonal ferrite powder [A · m²/kg] | Coercive force of hexagonal ferrite powder |
|---|---|---|---|---|---|---|---|
| Hexagonal ferrite powder 1 | Oleic acid | 17 nm | 90% | 15 nm | 22% | 40 | 231 kA/m (2900 Oe) |
| Hexagonal ferrite powder 2 | Polyalkyleneimine-polyester polymer J-2 | 15 nm | 92% | 14 nm | 19% | 42 | 215 kA/m (2700 Oe) |
| Hexagonal ferrite powder 3 | Polyalkyleneimine-polyester polymer J-3 | 14 nm | 91% | 14 nm | 18% | 43 | 219 kA/m (2750 Oe) |
| Hexagonal ferrite powder 4 | Polyalkyleneimine-polyester polymer J-6 | 16 nm | 93% | 15 nm | 19% | 41 | 227 kA/m (2850 Oe) |
| Hexagonal ferrite powder 5 | Polyalkyleneimine-polyester polymer J-7 | 15 nm | 91% | 15 nm | 20% | 43 | 207 kA/m (2600 Oe) |
| Hexagonal ferrite powder 6 | Polyalkyleneimine-polyester polymer J-11 | 15 nm | 92% | 14 nm | 20% | 41 | 211 kA/m (2650 Oe) |

From the results given in Table 2, it was determined based on Preparation Examples 1 to 6 that hexagonal ferrite powders containing greater than or equal to 80%, based on number of particles, of isotropic particles satisfying relation 1 above (major axis length/minor axis length <1.2) and having an average particle size (average major axis length) of less than or equal to 30 nm were obtained.

A comparison of hexagonal ferrite powder 1 obtained in Preparation Example 1 and hexagonal ferrite powders 2 to 6 obtained in Preparation Examples 2 to 6 confirmed that the use of polyalkyleneimine-polyester polymer during synthesis of the hexagonal ferrite increased the uniformity in particle size of the isotropic particles satisfying relation 1 relative to when oleic acid was employed. Increasing the uniformity in particle size of the isotropic particles satisfying relation 1, which accounted for the greater portion of the hexagonal ferrite powder (greater than or equal to 80% based on number of particles) was desirable to further enhance the electromagnetic characteristics of the magnetic recording medium containing hexagonal ferrite powder in the magnetic layer thereof.

Examples and Comparative Examples relating to magnetic recording media (magnetic tapes)

Examples 1-1 to 1-23

(1) Formula of Magnetic Layer-Forming Composition (Magnetic liquid)

| | |
|---|---|
| Ferromagnetic powder (hexagonal ferrite powder 1 obtained in Preparation Example 1 above): | 100.0 parts |
| Polyalkyleneimine-polyester polymer (see Table 3): | 8.0 parts |
| SO₃Na-group containing polyurethane resin: (weight average molecular weight: 70,000, SO₃Na groups: 0.4 meq/g) | 6.0 parts |
| Cyclohexanone: | 150.0 parts |
| Methyl ethyl ketone: | 150.0 parts |

(Abrasive liquid A)

| | |
|---|---|
| Alumina abrasive (average particle size: 100 nm): | 3.0 parts |
| Sulfonic acid group-containing polyurethane resin: (weight average molecular weight: 70,000, SO₃Na groups: 0.3 meq/g) | 0.3 part |
| Cyclohexanone: | 26.7 parts |

(Abrasive liquid B)

| | |
|---|---|
| Diamond abrasive (average particle size: 100 nm): | 1 part |
| Sulfonic acid group-containing polyurethane resin: (weight average molecular weight: 70,000, SO₃Na groups: 0.3 meq/g) | 0.1 part |
| Cyclohexanone: | 26.7 parts |

(Silica sol)

| | |
|---|---|
| Colloidal silica (average particle size: 100 nm): | 0.2 part |
| Methyl ethyl ketone: | 1.4 parts |

(Other components)

| | |
|---|---|
| Stearic acid: | 2.0 parts |
| Butyl stearate: | 6.0 parts |
| Polyisocyanate (Coronate made by Nippon Polyurethane Industry Co., Ltd.): | 2.5 parts |

(Finishing solvents)

| | |
|---|---|
| Cyclohexanone: | 200.0 parts |
| Methyl ethyl ketone: | 200.0 parts |

(2) Formula of Nonmagnetic Layer-Forming Composition

| | |
|---|---|
| Nonmagnetic inorganic powder α-iron oxide: Average particle size: 10.0 nm Average acicular ratio (average value of major axis length/minor axis length): 1.9 Brunauer-Emmett-Teller (BET) specific surface area: 75 m²/g | 100.0 parts |
| Carbon black (average particle size: 20 nm): | 25.0 parts |
| SO₃Na-group containing polyurethane resin: (weight average molecular weight: 70,000, SO₃Na groups: 0.2 meq/g) | 18.0 parts |
| Stearic acid: | 1.0 part |
| Cyclohexanone: | 300.0 parts |

-continued

| | |
|---|---|
| Methyl ethyl ketone: | 300.0 parts |
| Nonmagnetic inorganic powder α-iron oxide: | 80.0 parts |
| Average particle size: 0.15 μm | |
| Average acicular ratio (average value of major axis length/minor axis length): 7 | |
| BET specific surface area: 52 m²/g | |
| Carbon black (average particle size: 20 nm): | 20.0 parts |
| Vinyl chloride copolymer: | 13.0 parts |
| Sulfonic acid group-containing polyurethane resin: | 6.0 parts |
| Phenylphosphonic acid: | 3.0 parts |
| Stearic acid: | 3.0 parts |
| Butyl stearate: | 3.0 parts |
| Polyisocyanate: | 5.0 parts |
| Methyl ethyl ketone: | 155.0 parts |
| Cyclohexanone: | 355.0 parts |

(3) Fabrication of Magnetic Tape

The magnetic liquid was dispersed for 24 hours with a batch-type vertical sand mill. Zirconia beads 0.5 mmΦ in diameter were employed as dispersion beads. Abrasive liquids A and B were dispersed for 24 hours in a batch-type ultrasonic device (20 kHz, 300 W). These dispersions were mixed with the other components (silica sol, other components, and finishing solvents) and then processed for 30 minutes in a batch-type ultrasonic device (20 kHz, 300 W). Subsequently, filtration was conducted with a filter having an average pore diameter of 0.5 μm to prepare a magnetic layer-forming composition.

For the nonmagnetic layer-forming composition, the various components were dispersed for 24 hours in a batch-type vertical sand mill. Zirconia beads 0.1 mmΦ in diameter were employed as dispersion beads. The dispersion obtained was filtered with a filter having an average pore diameter of 0.5 μm to prepare a nonmagnetic layer-forming composition.

For the backcoat layer-forming composition, the various components—excluding the lubricants (stearic acid and butyl stearate), polyisocyanate, and 200.0 parts of cyclohexanone—were kneaded and diluted in an open kneader and then subjected to 12 passes of processing in a horizontal bead mill disperser, each pass consisting of a 2 minute retention time, at a rotor tip peripheral speed of 10 m/s, using 1 mmΦ zirconia beads at a bead fill rate of 80 volume %. The remaining components were then added to the dispersion and the mixture was stirred in a dissolver. The dispersion obtained was filtered with a filter having an average pore diameter of 1 μm to prepare a backcoat layer-forming composition.

Subsequently, the nonmagnetic layer-forming composition was coated and dried on a polyethylene naphthalate support 5 μm in thickness to a dry thickness of 100 nm, after which the magnetic layer-forming composition was coated thereover in a quantity calculated to yield a dry thickness of 70 nm to form a coating layer. Before the coating layer of the magnetic layer-forming composition had dried, a magnetic field with a magnetic field intensity of 0.6 T was applied perpendicularly to the surface of the coating layer to conduct a vertical orientation treatment, after which the coating layer was dried. The backcoat layer-forming composition was then coated and dried to a thickness of 0.4 μm on the opposite surface of the support.

A surface smoothing treatment (calendering treatment) was then conducted at a calender roll surface temperature of 100° C., a linear pressure of 300 kg/cm, and a rate of 100 m/minute with a calender comprised solely of metal rolls. A heat treatment was then conducted for 36 hours in an environment of an atmospheric temperature of 70° C. Following the heat treatment, the product was slit to ½ inch (0.0127 meter) width to obtain a magnetic tape.

Comparative Example 1-1

With the exceptions that no polyalkyleneimine-polyester polymer was added to the magnetic layer-forming composition and the quantity of $SO_3Na$ group-containing polyurethane resin was increased to 8.0 parts, a magnetic tape was obtained by the same method as in Example 1-1.

Comparative Example 1-2

With the exception that the polyalkyleneimine-polyester polymer was replaced with 8.0 parts of 2,3-dihydroxynaphthalene, a magnetic tape was obtained by the same method as in Example 1-1.

Comparative Example 1-3

With the exception that the hexagonal ferrite powder set forth below (plate-like hexagonal ferrite powder) in the form of powder comprised of plate-like particles was employed as the ferromagnetic powder of the magnetic layer-forming composition, a magnetic tape was obtained by the same method as in Example 1-6. The form of 500 particles randomly extracted from the powder was observed, and all of the particles were confirmed to be plate-like particles. The average value (average plate diameter) of the plate diameter as determined by electron microscope by the same method as in evaluation method (2) above and the average value of the plate diameter/plate thickness (average plate ratio) are given below.

<Plate-Like Hexagonal Ferrite Powder>
Average particle size (average plate diameter): 20 nm
Average plate ratio: 2.7
Composition excluding oxygen (molar ratio): Ba/Fe/Co/Zn=1/9/0.2/1
Saturation magnetization: 46 A·m²/kg
Coercive force: 160 kA/m (2,000 Oe)

Comparative Example 1-4

With the exceptions that plate-like hexagonal ferrite powder was employed in the same manner as in Comparative Example 1-3 as ferromagnetic powder in the magnetic layer-forming composition, a magnetic tape was obtained by the same method as in Comparative Example 1-1.

Comparative Examples 2-1 to 2-5

With the exception that the hexagonal ferrite powders given in Table 3 were employed as ferromagnetic powder in the magnetic layer-forming composition, a magnetic tape was obtained by the same method as in Comparative Example 1-1.

Comparative Examples 3-1 to 3-5

With the exceptions that the hexagonal ferrite powders given in Table 3 were employed as ferromagnetic powder in the magnetic layer-forming composition and the polyalkyleneimine-polyester polymers given in Table 3 were employed as the polyalkyleneimine-polyester, magnetic tapes were obtained by the same method as in Comparative Example 1-1.

Evaluation Methods
1. Squareness in the Vertical Direction

The squareness in the vertical direction of the various magnetic tapes of Examples and Comparative Examples was measured at a magnetic field intensity of 1194 kA/m (15 kOe) with a vibrating sample magnetometer (made by Toei Industrial Co., Ltd.).

2. Electromagnetic Characteristics (SNR) Evaluation

Magnetic signals were recorded in the longitudinal direction of the various magnetic tapes of Examples and Comparative Examples, and reproduced with a magnetoresistive (MR) head. The reproduced signals were frequency analyzed with a spectrum analyzer made by Shibasoku, and the ratio of the output at 300 kfci and the noise integrated over a range of 0 to 600 kfci was adopted as the SNR.

| (Recording and reproduction conditions) | | |
|---|---|---|
| Recording: | Recording track width: | 5 μm |
| | Recording gap: | 0.17 μm |
| | Head saturation magnetic flux density Bs: | 1.8 T |
| Reproduction: | Reproduction track width: | 0.4 μm |
| | Distance between shields (shield-shield spacing): | 0.08 μm |
| | Recording wavelength: | 300 kfci |

The results of the above are given in Table 3.

TABLE 3

| | Ferromagnetic powder | Polyalkyleneimine-polyester polymer or other organic compound employed during preparation of hexagonal ferrite powder | Polyalkyleneimine-polyester polymer or other organic compound added to magnetic layer-forming composition | SNR | Squareness in the vertical direction of magnetic tape |
|---|---|---|---|---|---|
| Example 1-1 | Hexagonal ferrite powder 1 | Oleic acid | J-1 | +1.1 dB | 0.71 |
| Example 1-2 | Hexagonal ferrite powder 1 | Oleic acid | J-2 | +1.5 dB | 0.73 |
| Example 1-3 | Hexagonal ferrite powder 1 | Oleic acid | J-3 | +1.2 dB | 0.72 |
| Example 1-4 | Hexagonal ferrite powder 1 | Oleic acid | J-4 | +1.0 dB | 0.72 |
| Example 1-5 | Hexagonal ferrite powder 1 | Oleic acid | J-5 | +1.1 dB | 0.73 |
| Example 1-6 | Hexagonal ferrite powder 1 | Oleic acid | J-6 | +1.7 dB | 0.74 |
| Example 1-7 | Hexagonal ferrite powder 1 | Oleic acid | J-7 | +1.0 dB | 0.74 |
| Example 1-8 | Hexagonal ferrite powder 1 | Oleic acid | J-8 | +1.6 dB | 0.72 |
| Example 1-9 | Hexagonal ferrite powder 1 | Oleic acid | J-9 | +1.3 dB | 0.73 |
| Example 1-10 | Hexagonal ferrite powder 1 | Oleic acid | J-10 | +1.3 dB | 0.71 |
| Example 1-11 | Hexagonal ferrite powder 1 | Oleic acid | J-11 | +1.6 dB | 0.73 |
| Example 1-12 | Hexagonal ferrite powder 1 | Oleic acid | J-12 | +1.2 dB | 0.73 |
| Example 1-13 | Hexagonal ferrite powder 1 | Oleic acid | J-13 | +1.1 dB | 0.71 |
| Example 1-14 | Hexagonal ferrite powder 1 | Oleic acid | J-14 | +1.2 dB | 0.71 |
| Example 1-15 | Hexagonal ferrite powder 1 | Oleic acid | J-15 | +1.4 dB | 0.71 |
| Example 1-16 | Hexagonal ferrite powder 1 | Oleic acid | J-16 | +1.3 dB | 0.72 |
| Example 1-17 | Hexagonal ferrite powder 1 | Oleic acid | J-17 | +1.1 dB | 0.73 |
| Example 1-18 | Hexagonal ferrite powder 1 | Oleic acid | J-18 | +1.1 dB | 0.72 |
| Example 1-19 | Hexagonal ferrite powder 1 | Oleic acid | J-19 | +1.2 dB | 0.73 |
| Example 1-20 | Hexagonal ferrite powder 1 | Oleic acid | J-20 | +1.3 dB | 0.71 |
| Example 1-21 | Hexagonal ferrite powder 1 | Oleic acid | J-21 | +1.2 dB | 0.71 |
| Example 1-22 | Hexagonal ferrite powder 1 | Oleic acid | J-22 | +1.4 dB | 0.71 |
| Example 1-23 | Hexagonal ferrite powder 1 | Oleic acid | J-23 | +1.4 dB | 0.72 |
| Comp. Ex. 1-1 | Hexagonal ferrite powder 1 | Oleic acid | — | +0.7 dB | 0.60 |
| Comp. Ex. 1-2 | Hexagonal ferrite powder 1 | Oleic acid | 2,3-Dihydroxy-naphthalene | +0.7 dB | 0.59 |
| Comp. Ex. 1-3 | Plate-like hexagonal ferrite powder | — | J-6 | ±0.0 dB | 0.71 |
| Comp. Ex. 1-4 | Plate-like hexagonal ferrite powder | — | — | −0.8 dB | 0.71 |

TABLE 3-continued

|  | Ferromagnetic powder | Polyalkyleneimine-polyester polymer or other organic compound employed during preparation of hexagonal ferrite powder | Polyalkyleneimine-polyester polymer or other organic compound added to magnetic layer-forming composition | SNR | Squareness in the vertical direction of magnetic tape |
|---|---|---|---|---|---|
| Example 2-1 | Hexagonal ferrite powder 2 | J-2 | — | +1.2 dB | 0.67 |
| Example 2-2 | Hexagonal ferrite powder 3 | J-3 | — | +1.0 dB | 0.65 |
| Example 2-3 | Hexagonal ferrite powder 4 | J-6 | — | +1.4 dB | 0.68 |
| Example 2-4 | Hexagonal ferrite powder 5 | J-7 | — | +1.2 dB | 0.67 |
| Example 2-5 | Hexagonal ferrite powder 6 | J-11 | — | +1.1 dB | 0.66 |
| Example 3-1 | Hexagonal ferrite powder 2 | J-2 | J-2 | +1.8 dB | 0.73 |
| Example 3-2 | Hexagonal ferrite powder 3 | J-3 | J-3 | +1.7 dB | 0.72 |
| Example 3-3 | Hexagonal ferrite powder 4 | J-6 | J-6 | +1.9 dB | 0.74 |
| Example 3-4 | Hexagonal ferrite powder 5 | J-7 | J-7 | +1.8 dB | 0.73 |
| Example 3-5 | Hexagonal ferrite powder 6 | J-11 | J-11 | +1.6 dB | 0.72 |

Based on the results given in Table 3, the magnetic tapes of Examples were confirmed to exhibit good electromagnetic characteristics during the reproduction of signals recorded at high density. The present inventors presume this to be the result of being able to keep the squareness in the vertical direction of the magnetic layer to greater than or equal to 0.65 but less than or equal to 1.00 by increasing the vertical orientation property of hexagonal ferrite powder containing greater than or equal to 80%, based on number of particles, of isotropic particles satisfying relation 1 and having an average particle size of less than or equal to 30 nm.

It is stated in Example in Japanese Unexamined Patent Publication (KOKAI) No. 2012-203955 that the squareness in the vertical direction of the magnetic layer containing the organic compound (2,3-dihydroxynaphthalene) added to the magnetic layer-forming composition in Comparative Example 1-2 and plate-like hexagonal ferrite powder was 0.70. However, in Comparative Example 1-2, it was impossible to keep the squareness in the vertical direction of the magnetic layer containing greater than or equal to 80%, based on number of particles, of isotropic particles satisfying relation 1 and having an average particle size of less than or equal to 30 nm to greater than or equal to 0.65 but less than or equal to 1.00, even with the use of 2,3-dihydroxynaphthalene. From this result as well, it can be confirmed that it has conventionally been difficult to increase the squareness in the vertical direction of hexagonal ferrite powder containing greater than or equal to 80%, based on number of particles, of isotropic particles satisfying relation 1 and having an average particle size of less than or equal to 30 nm, and this has only become possible based on the results of extensive research conducted by the present inventors.

An aspect of the present invention is useful in the technical field of magnetic recording media for high-density recording.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium,
   which comprises a magnetic layer comprising ferromagnetic powder and binder on a nonmagnetic support,
   wherein the ferromagnetic powder is hexagonal ferrite powder comprising, based on the number of particles, greater than or equal to 80% isotropic particles that satisfy the following relation 1:
   major axis length/minor axis length <1.2;
   with an average particle size of the hexagonal ferrite powder being less than or equal to 30 nm, and
   a squareness in a vertical direction of the magnetic layer being greater than or equal to 0.65 but less than or equal to 1.00.

2. The magnetic recording medium according to claim 1, wherein the ferromagnetic powder is hexagonal ferrite powder comprising greater than or equal to 90%, based on number of particles, of the isotropic particles.

3. The magnetic recording medium according to claim 1, wherein a coefficient of variation in a particle size of the isotropic particles is less than or equal to 25%.

4. The magnetic recording medium according to claim 1, wherein a coefficient of variation in a particle size of the isotropic particles is less than or equal to 20%.

5. The magnetic recording medium according to claim 2, wherein a coefficient of variation in a particle size of the isotropic particles is less than or equal to 25%.

6. The magnetic recording medium according to claim 2, wherein a coefficient of variation in a particle size of the isotropic particles is less than or equal to 20%.

7. The magnetic recording medium according to claim 1, wherein the magnetic layer comprises a compound comprising a polyalkyleneimine chain and a polyester chain.

8. The magnetic recording medium according to claim 2, wherein the magnetic layer comprises a compound comprising a polyalkyleneimine chain and a polyester chain.

9. The magnetic recording medium according to claim 3, wherein the magnetic layer comprises a compound comprising a polyalkyleneimine chain and a polyester chain.

10. The magnetic recording medium according to claim 4, wherein the magnetic layer comprises a compound comprising a polyalkyleneimine chain and a polyester chain.

11. The magnetic recording medium according to claim 5, wherein the magnetic layer comprises a compound comprising a polyalkyleneimine chain and a polyester chain.

12. The magnetic recording medium according to claim 6, wherein the magnetic layer comprises a compound comprising a polyalkyleneimine chain and a polyester chain.

* * * * *